(12) United States Patent
Ayyar et al.

(10) Patent No.: US 9,785,637 B2
(45) Date of Patent: Oct. 10, 2017

(54) SYSTEM AND METHOD FOR COMPUTING, APPLYING, AND DISPLAYING DOCUMENT DELTAS

(71) Applicant: Google, Inc., Mountain View, CA (US)

(72) Inventors: Kartik Ayyar, Sunnyvale, CA (US); Christopher Jienping Han, Sunnyvale, CA (US)

(73) Assignee: Google Inc., Mountin View, CA (US)

( * ) Notice: Subject to any disclaimer, the term of this patent is extended or adjusted under 35 U.S.C. 154(b) by 361 days.

(21) Appl. No.: 14/645,072

(22) Filed: Mar. 11, 2015

(65) Prior Publication Data

US 2015/0269146 A1  Sep. 24, 2015

Related U.S. Application Data

(60) Provisional application No. 61/954,818, filed on Mar. 18, 2014.

(51) Int. Cl.
*G06F 17/30* (2006.01)
*G06Q 10/10* (2012.01)

(52) U.S. Cl.
CPC .... *G06F 17/30011* (2013.01); *G06F 17/3007* (2013.01); *G06Q 10/101* (2013.01)

(58) Field of Classification Search
CPC ............. G06F 17/246; G06F 17/30011; G06F 17/3007; G06F 17/30088; G06F 17/30162; G06F 17/30165; G06F 17/30179; G06F 17/30194; G06Q 10/101; G06Q 10/103
USPC ....... 707/608, 625, 638, 639, 649, 656, 695, 707/704, 821; 715/212, 741, 743, 751; 709/206
See application file for complete search history.

(56) References Cited

U.S. PATENT DOCUMENTS

| 8,984,392 | B2* | 3/2015 | Clarke | G06F 17/2211 715/220 |
| 2004/0172442 | A1* | 9/2004 | Ripley | G06F 17/30985 709/200 |
| 2005/0044145 | A1 | 2/2005 | Quinn et al. | |
| 2010/0257457 | A1 | 10/2010 | De Goes | |
| 2012/0143917 | A1* | 6/2012 | Prabaker | G06F 17/30165 707/784 |
| 2012/0284344 | A1 | 11/2012 | Costenaro et al. | |
| 2014/0250058 | A1* | 9/2014 | Thiruvidan | G06F 17/30011 707/608 |
| 2014/0281870 | A1* | 9/2014 | Vogel | G06F 17/246 715/220 |
| 2015/0199307 | A1* | 7/2015 | Zhang | G06F 17/30873 715/208 |
| 2015/0248405 | A1* | 9/2015 | Rudich | G06Q 10/0631 707/608 |

OTHER PUBLICATIONS

PCT International Search Report and Written Opinion for Application No. PCT/US2015/021340, dated Jun. 29, 2015.

* cited by examiner

*Primary Examiner* — Greta Robinson
(74) *Attorney, Agent, or Firm* — Lowenstein Sandler LLP

(57) ABSTRACT

Systems and methods are disclosed herein for computing, applying, and displaying document deltas. Snapshots are stored of documents, and the stored snapshots are flattened. Deltas of the flattened snapshots are computed. The deltas are converted to representations of changes in the document by inverting the flattening. The representations of changes are displayed to a user via a feed. Users of the systems and methods can accept, reject, and comment on the changes.

20 Claims, 23 Drawing Sheets

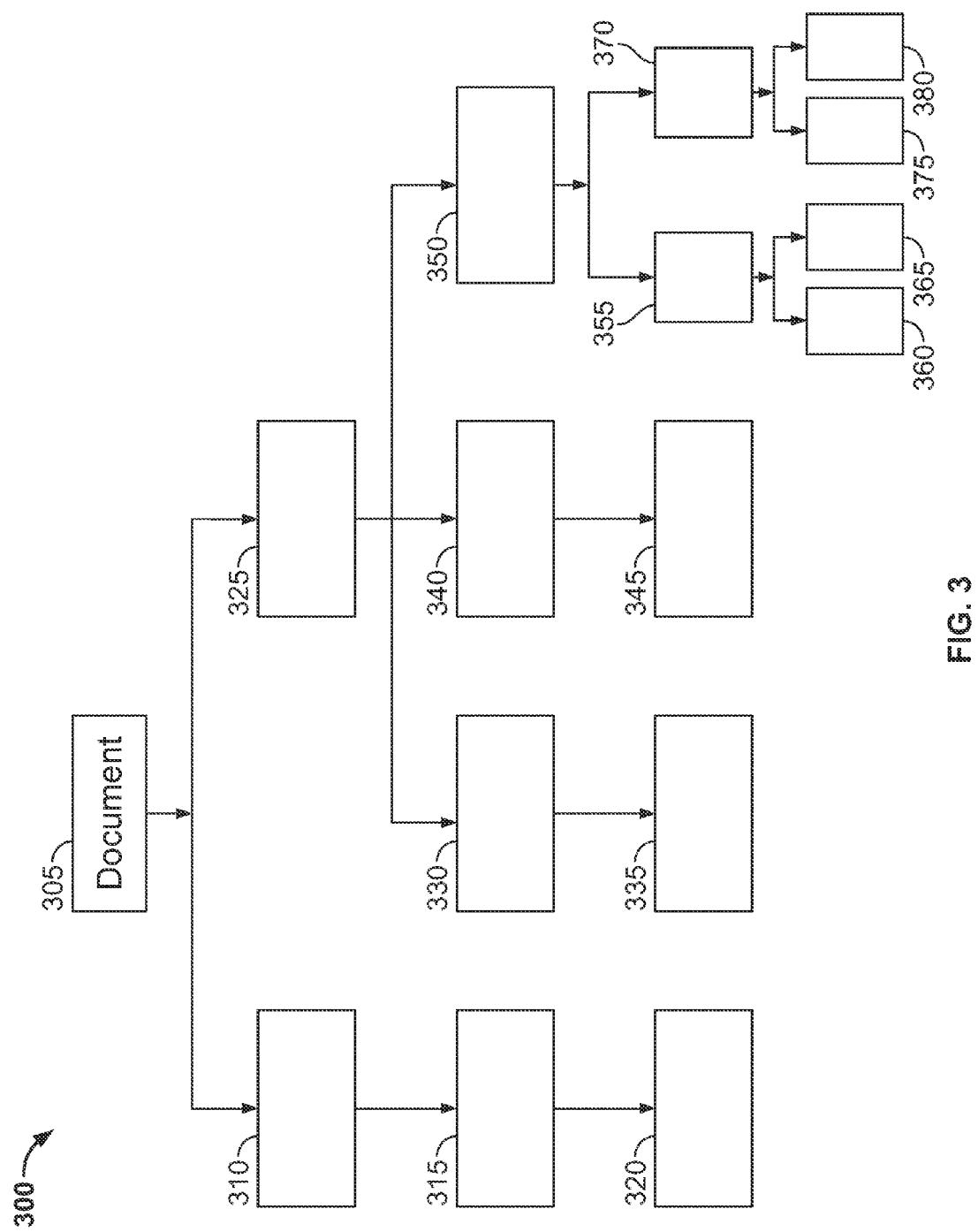

400  402
406 — Today we introduce Kittens as a Service (KaaS). On-demand kittens with guaranteed 99.99% playtime.
404
408
412 — KaaS will launch in San Francisco, New York, and Boston today. KaaS will roll out in other major markets soon afterwards.
410
414                                                                                416
KaaS provides everything you need for getting all the kitten love you need with an affordable monthly subscription plan.
420 — Try out starter pack, which includes one adorable kitten with unlimited cuddles. Or try our enterprise plan for large households and organizations (please call for pricing).    418

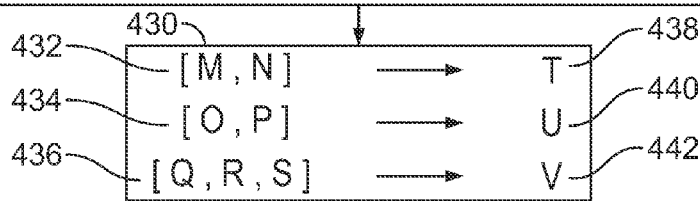

430
432 — [ M , N ]  →  T — 438
434 — [ O , P ]  →  U — 440
436 — [ Q , R , S ]  →  V — 442

450  452
456 — Today we introduce Kittens as a Service (KaaS). On-demand kittens with guaranteed 99.99% playtime.
454
472   458
462 — KaaS will launch in San Francisco, New York, and Boston today. Rollouts in other major markets will occur soon.
460
464
KaaS provides everything you need for getting all the kitten love you need with an affordable monthly subscription plan. Try  466
470 — out the starter pack, which includes one adorable kitten with unlimited cuddles. Or try our enterprise plan for large households and organizations (please call for pricing).    468

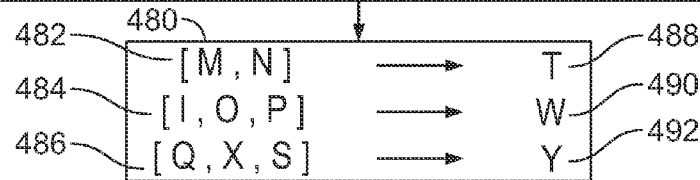

|   | A | B | C |
|---|---|---|---|
| 1 | AAA 802 | BBB 804 | CCC 806 |
| 2 | DDD 808 | EEE 810 | FFF 812 |

800

|   | A | B |
|---|---|---|
| 1 | AAA 852 | BBB 854 |
| 2 | DDD 856 | EEE 858 |

902 ['AAA', 'BBB', 'CCC'] --▶ M 912
904 ['DDD', 'EEE', 'FFF'] --▶ N 914
908 ['AAA', 'BBB'] --▶ O 916
910 ['DDD', 'EEE'] --▶ P 918

920

922 ['AAA', 'DDD'] --▶ R 928
924 ['BBB', 'EEE'] --▶ S 930
926 ['CCC', 'FFF'] --▶ T 932

FIG. 9

|   | A | B | C | D | E | F | G | H | I | J | K | L | M | N | O | P |
|---|---|---|---|---|---|---|---|---|---|---|---|---|---|---|---|---|
| 1 | FCF Model | 2013 | 2014 | 2015 | 2016 | 2017 | 2018 | 2019 | 2020 | 2021 | 2022 | 2023 | | | | Notes |
| 2 | | | | | | | | | | | | | | | | |
| 10 | Barrels Developed | | 0.25 | 0.25 | 0.25 | 0.25 | | | | | | | Assumptions | | | |
| 15 | Lifting Cost /BOE | 5 | 5.35 | 5.72 | 6.13 | 6.55 | 7.01 | 7.5 | 8.03 | 8.59 | 9.19 | 9.84 | | Lifting Cost /BOE | 5 | Cohen Assumption |
| 18 | Net Revenue | 0 | 0 | 0 | 0 | 0 | 5 | 5 | 5 | 5 | 5 | 5 | | Rf | 0.04 | 10 Year Treasury |
| 37 | Present Value | -5.6 | -2.2 | -2.16 | -2.12 | -2.08 | 1.95 | 1.77 | 1.6 | 1.45 | 1.31 | 1.18 | | Discount Rate | 0.09 | |
| 38 | NPV | -4.88 | | | | | | | | | | | | | | |
| | Oil Model | | | | | | | | | | | | | | | |

FIG. 13A

C  Chris changed
▦ Wine Collection and Tasting Notes

| | A | B | C | D | E | F | G | H | I |
|---|---|---|---|---|---|---|---|---|---|
| 1 | Winery | Bottle | Year | Retail Price | Purchase Price | Chris's Tasting Notes | Kassidy's Tasting Notes | Chris rating | Kassidy rating |
| 2 | | | | | | | | | |
| 11 | Penfolds | Bin 2 Shiraz | 2012 | 15 | 7.5 | Really good value. Notes of raspberry. | | 6 | 6 |
| 13 | Penfolds | CR Pinot Noir | 2007 | 35 | 17.5 | Full and meaty, interesting. Wasn't a huge fan... | | 4 | 5 |

Sheet 1

Like • Mar 15 11:31 AM (2 days ago) • ▦

C  Write a comment...                                via feed ⊙

C | Chris changed
  | x wine1.xlsx

| | A | B | C | D | E | F | G | H | I |
|---|---|---|---|---|---|---|---|---|---|
| 1 | Winery | Bottle | Year | Retail Price | Purchase Price | Chris's Tasting Notes | Kassidy's Tasting Notes | Chris rating | Kassidy rating |
| 2 | Beninger | Luminus Chardonnay | 1012 | 40 | 8 | A Nice, not too Sweet Chard, with a Surp... | | | |
| 3 | Beninger | Blanc | 2010 | 22 | 11 | Pleasant, not too | | 5 | 5 |

Like ▴ 9:21 PM (17 hours ago)

1804

C | Write a Comment...

When clicked, the "See More" link reveals the full change with a smooth animation.

See More
1802

Via Feed

< Feed

Follow

Karthik changed
Companies to checkout

| | A | B | C |
|---|---|---|---|
| 1 | Adjacent Companies | Comment | Links |
| 2 | | | |
| 74 | Doc | A document organizer -claims to be 'Eve... | http://example.com |

Companies

SYSTEM AND METHOD FOR COMPUTING, APPLYING, AND DISPLAYING DOCUMENT DELTAS

CROSS REFERENCE TO RELATED APPLICATIONS

This application claims priority to U.S. Provisional Application Ser. No. 61/954,818 filed Mar. 18, 2014, entitled "System And Method For Computing, Applying, And Displaying Document Deltas," the entire contents of which are hereby incorporated by reference.

BACKGROUND

Collaborative content creation (e.g., collaborative document creation and editing) presents a number of technical challenges, not the least of which is the computing, application and displaying of differences (or deltas) between versions of content. In particular, where a number of collaborators are contributing towards content creation over time, the ability to compute and communicate information regarding content deltas (e.g., who made which changes and when) presents a number of computing and person-machine interface technical challenges.

SUMMARY

Accordingly, systems and methods are described herein for computing, applying, and displaying document deltas. In certain aspects, the systems and methods described herein relate to flattening document snapshots, and comparing the flattened one-dimensional document snapshots. A first snapshot of the collaborative document is stored. An edit to the collaborative document is received from a first user, and the collaborative document is modified based on the first edit. A second snapshot of the modified collaborative document is stored. The first snapshot is flattened into a first one-dimensional string to result in a first flattened snapshot. The second snapshot is flattened into a second one-dimensional string to result in a second flattened snapshot. A smallest subset of the second flattened snapshot that is different from a corresponding subset of the first flattened snapshot is determined. A feed comprising a representation of the determined smallest subset is generated, and the feed is sent to a client device for display on the client device.

In some aspects, a new portion may be generated by inverting the flattening of the determined smallest subset, and an old portion may be generated by inverting the flattening of the corresponding subset. In some aspects, the feed comprises a context portion of the electronic document that is common to the first and second snapshots.

In some aspects, a comment is received from one of the first and second users. The feed is modified to include a representation of the comment, and the modified feed is sent to the client device for display on the client device.

In some aspects, a second edit to the modified collaborative document is received from a second user. The modified collaborative document is further modified based on the second edit. A third snapshot of the further modified collaborative document is stored. The third snapshot is flattened into a third one-dimensional string to result in a third flattened snapshot. A second smallest subset of the third flattened snapshot that is different from a corresponding subset of the second flattened snapshot is determined. The feed is modified to include a representation of the second smallest subset. The feed is sent to a client device for display on the client device.

In some aspects, the first snapshot is flattened into a fourth one-dimensional string to result in a fourth flattened snapshot. The second snapshot is flattened into a fifth one-dimensional string to result in a fifth flattened snapshot. A third smallest subset of the fifth flattened snapshot that is different from a corresponding subset of the fourth flattened snapshot is determined. In some aspects, the determined smallest subset is the third smallest subset.

In some aspects, the collaborative document is a spreadsheet document. The fourth and fifth one-dimensional string each contain a plurality of identifiers, and each of the identifiers represents a row in the spreadsheet document.

In some aspects, each snapshot of the collaborative document comprises a hierarchy of nodes including a plurality of levels, one master node containing data, and a plurality of non-master nodes containing data. Each of the non-master nodes has a parent node in the level above, and each of the nodes has zero, one, or more child nodes in the level below. The number of levels between each node in a level and the master node is the same. Flattening the first snapshot into the first one-dimensional string comprises selecting a level, mapping a first node in the selected level to a first identifier, and adding the first identifier to the first one-dimensional string. In some aspects, flattening the second snapshot into the second one-dimensional string comprises mapping a second node in the corresponding selected level of the second snapshot to the first identifier, based on a determination that the contents of the second node are the same as the contents of the first node, and adding the first identifier to the second one-dimensional string.

In some aspects, flattening the second snapshot into the second one-dimensional string further comprises mapping a third node in the corresponding selected level of the second snapshot to a second identifier, based on a determination that the data contained in the third node are different from the contents of any of the nodes in the selected level of the first snapshot, and adding the second identifier to the second one-dimensional string.

In some aspects, determining the smallest subset comprises determining that the first and second one-dimensional strings contain the first identifier and excluding the first identifier from the smallest subset.

In some aspects, determining the smallest subset comprises determining that the first one-dimensional string does not contain the second identifier and including the second identifier in the smallest subset.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 3 is a block diagram of a document object model, according to an illustrative implementation;

FIG. 4 depicts snapshots and flattened snapshots of a document, according to an illustrative implementation;

FIG. 8 depicts snapshots of a spreadsheet document, according to an illustrative implementation;

FIG. 9 depicts the operation of a document flattening module, according to an illustrative implementation;

FIGS. 13A and 13B depict examples in which rows and columns have been stripped after performing row and column-wise comparisons, according to an illustrative implementation;

FIG. 17 depicts a user interface that shows an increased level of context for faster user interpretation, according to an illustrative implementation;

FIG. 18 depicts a user interface that shows a subset of a change, according to an illustrative implementation;

FIG. 19 depicts a user interface as output by a user interface module and rendered for display on a mobile device, according to an illustrative implementation;

DETAILED DESCRIPTION OF THE DRAWINGS

In the following description, for purposes of explanation, numerous specific details are set forth in order to provide a thorough understanding of some examples. It will be evident, however, to one skilled in the art that the present invention may be practiced without these specific details. For example, while examples herein are discussed with specific reference to documents and spreadsheets, the methods and systems described herein may equally well be applied to other types of content.

With collaborative cloud based documents, changes may be made frequently by multiple users. It can be technically challenging to compute, identify and display what was changed and by whom. Systems and methods are described herein for presenting these document (or content) changes in a human-readable and succinct manner. The example method is well suited for presentation in a "news feed," e-mail summaries, mobile applications, and other use cases where screen real-estate is limited. Such uses cases would enable a user to quickly gather what has changed over many documents and numerous authors without needing to open the document and search for what has changed. The systems and methods described herein are applicable to any document content type including, but not limited to, word processing documents, spreadsheet documents, presentation documents, form documents, database documents, web page documents and plain text documents. The systems and methods described herein may offer to the user succinct and human-readable summaries, contextual relevance, and usability across multiple devices and screen resolutions.

Figure 1:
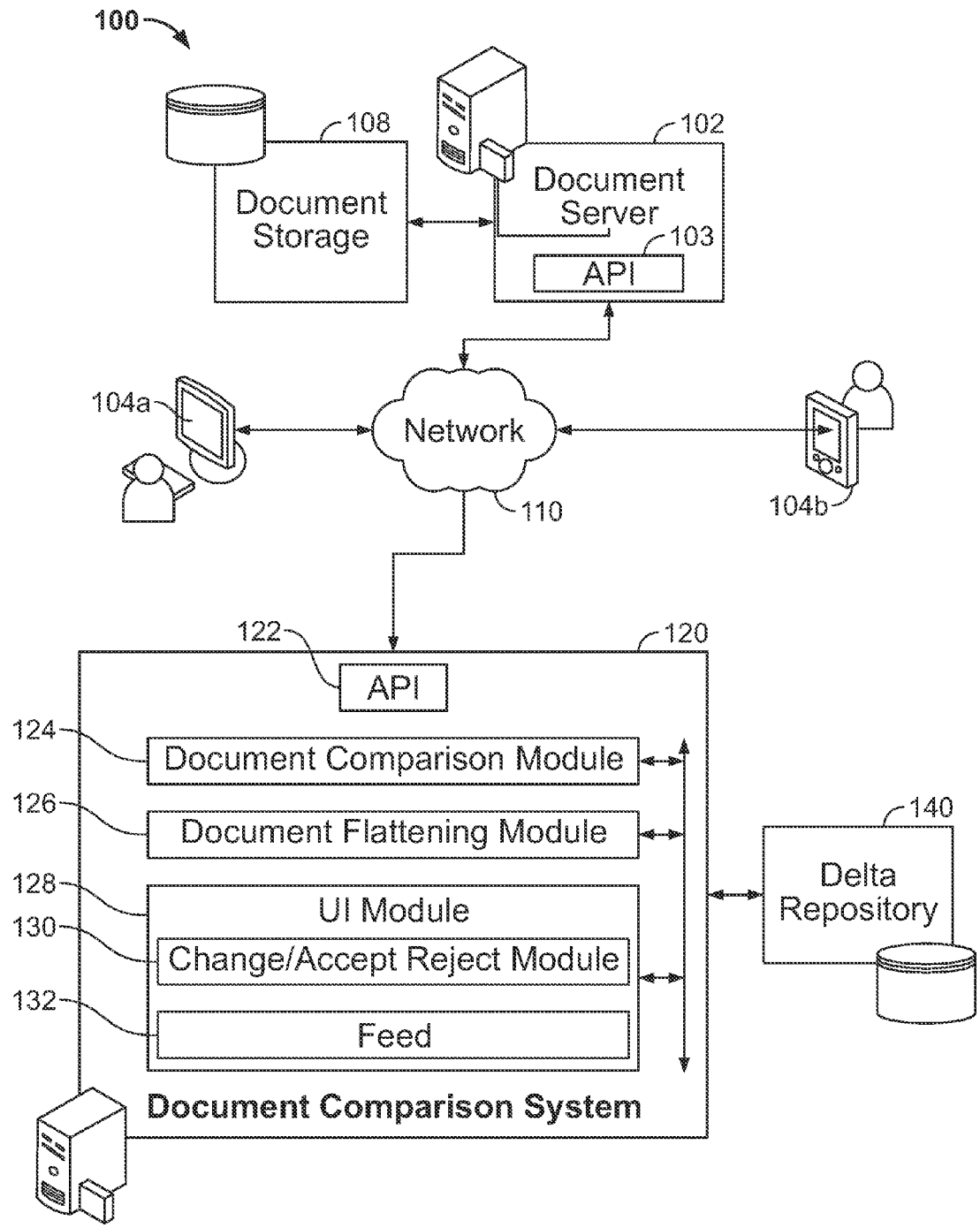
FIG. 1 is a block diagram of system for computing, applying, and displaying document deltas, according to an illustrative implementation.

The various algorithms described herein may be implemented within the context of a document comparison system as shown in FIG. 1, according to one example. FIG. 1 depicts a document server 102 communicatively coupled, via a network 110, to client devices 104a and 104b and a document comparison system 120. The document server 102 is also communicatively coupled to document storage 108. The document comparison system 120 is communicatively coupled to a delta repository 140a, in which is stored delta (e.g., change) information regarding multiple documents to which the document comparison system 120 has access via the network 110 (or in other examples, documents stored locally with respect to the document comparison system). The document server 102 interfaces with the network 110 by exposing an application programming interface (API) 103. The document comparison system 120 interfaces with the network 110 by exposing an API 122. The document comparison system 120 includes a document comparison module 124, a document flattening module 126, and a user interface (UI) module 128, all in communication with each other. The UI module 128 includes a change accept/reject module 130 and a feed module 132.

Specifically, the document comparison system 120 may access the document server via an API, which may comprise APIs 103 and 122, in order to retrieve various versions of documents from the document storage 108. In other examples, the document comparison system 120 may receive versioning and/or change information from the document server 102, indicating differences or deltas between documents stored within the document storage, via an API of the document server.

In examples wherein the document comparison system 120 has access to a local document storage 108 (e.g., as part of a server or computer system), the document comparison system 120 may access local versions of documents in order to identify versions, and/or extract versioning/change information pertaining to local documents.

The document comparison system 120 may, in some further examples, at least partially be implemented as a document comparison application that executes on a client device 104a or 104b (e.g., a mobile or portable computing device).

According to various examples, systems and methods are described herein for computing deltas between common classes of formats, presenting deltas in human-readable formats, and computing and storing aforementioned deltas across a collection of documents stored in cloud storage. Also, systems and methods are described herein for presenting document deltas for multiple screen resolutions, reapplying or inverting document deltas, and making fast, fine-grained determinations of last author for document sub-elements.

Figure 2:
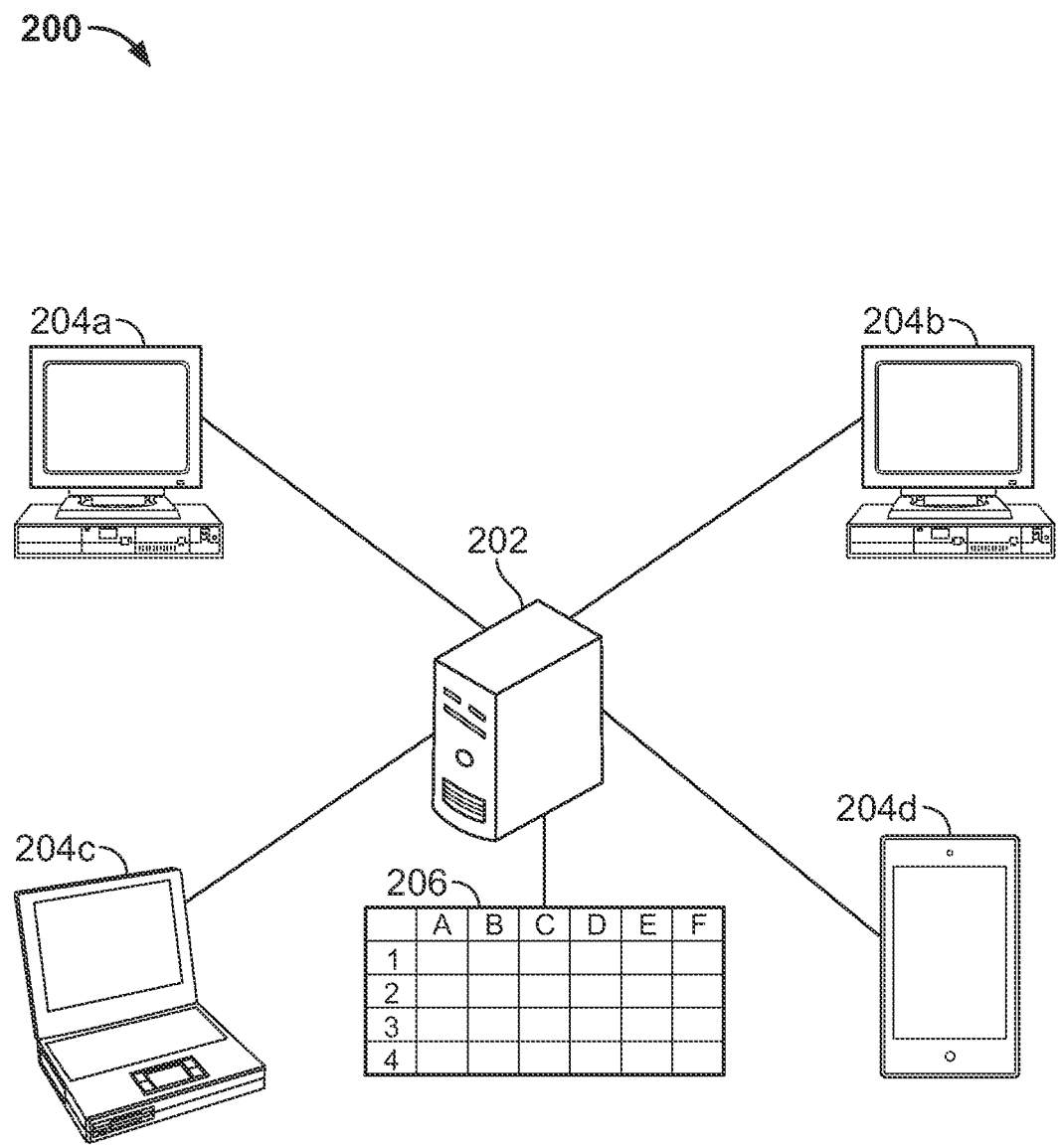
FIG. 2 is a block diagram of a cloud computing service, according to an illustrative implementation.

FIG. 2 shows a client-server system 200 that includes a cloud computing service 202 and a number of client devices 204a-204d (generally, client device 204). The cloud computing service 202 provides cloud computing services for a set of client devices 204. In particular, the cloud computing service 202 may include one or more servers that store a number of files accessible by the client devices 204a-204d, such as an exemplary collaborative spreadsheet 206. Users at the client devices 204 may create, edit, copy, share, and delete files stored on the cloud computing service 202. For example, the client devices 204 may each use a web browser to simultaneously access the spreadsheet 206 on the cloud computing service 202. The cloud computing service 202 provides each client device 204 with a local copy of the spreadsheet 206, which users on the client devices 204 may then view and edit. The cloud computing service 202 may synchronize the local copies of the spreadsheet 206 with one another and with a copy of the spreadsheet 206 that is stored on a server in the cloud computing service 202. In one example, edits, which may be referred to herein as changes, that are made by the client device 204a are automatically sent to the cloud computing service 202 and transmitted to the other client devices 204b, 204c, and 204d. In this manner, changes made by one collaborator may be immediately seen by other collaborators.

As used herein, a file includes a set of digitally encoded bits stored on a storage medium. A cloud file includes a file that is stored on a server and accessible via a network. A local file includes a file stored on a user's local device. A client device includes a local device that communicates with a server in a client-server relationship. As used herein, a client device is synonymous with a user device and a local device, unless indicated otherwise by context. As used herein, a document can be associated with multiple files. For example, a cloud file may be a copy of a document stored on a server, and a local file may be a copy of the same document stored on a local device. Generally, multiple copies of the same document may be identical, but they may differ if changes made by one collaborator have not yet been transmitted to other collaborators. This situation may occur when the network connection is slow or intermittent. Multiple copies of the same document may also differ slightly if the copies are stored on disparate types of devices, such as devices with different operating systems. In this case, different copies may have slightly different metadata, or may be encoded differently. For example, one copy may be encoded in a format in which the first bit in a byte contains the most significant bit, and another copy may be encoded in a format in which the first bit in a byte contains the least significant bit. These format differences can exist across multiple files that are copies of the same document, as long as the substance of the information that is displayed to the user is the same across the copies. A local device may read the contents of a file (stored in non-volatile memory) and store a model representing the file in working memory. The working memory may be volatile (e.g. RAM or an equivalent).

The client devices 204 may include any combination of desktop computers, laptop computers, tablets, smart phones, mobile electronic devices, or any other device that may connect to the cloud computing service 202 through a network. Only four client devices 204 are shown in system 200, but it should be understood that any number of client devices 204 of any type may be configured to communicate with the cloud computing service 202. The cloud computing service 202 and the client devices 204 of the system 200 may be connected through a remote network, such as the Internet. The network connection may be facilitated through a local area network, wide area network, Ethernet, fiber optic network, wireless network, cellular network, interactive television network, telephone network, wireless data transmission system, two-way cable system, customized private or public computer network, interactive kiosk network, direct link, satellite network, and or any other wired or wireless connection.

The document comparison system may include a number of sub-modules, namely a document comparison module, a document flattening module, and a user interface module. The user interface module may in turn include a change accept/reject module, and a feed module.

Files generated by common applications hold user data. Common file formats for documents include word processing documents, presentations and spreadsheets. Computing deltas (or diffs) between documents is valuable for the purposes of change tracking to let users know what has changed in different revisions of a document, and also for the purposes of selectively undoing edits or applying edits made to documents.

The terms deltas and diffs are used interchangeably herein.

Algorithms that compute deltas between two given one-dimensional string sequences, such as DIFF_MATCH_PATCH, are known. Such algorithms operate as follows: Given an original sequence of characters "ABC," and a modified sequence of characters "ABCD," such algorithms will return an output denoting the string "ABC" as unmodified and denoting the string "D" as added. Given the initial string of characters "ABC" and a modified string of characters "AB," such algorithms will return an output denoting as unmodified the string "AB" and denoting as deleted the string "C." Given an original string of characters ABC and a modified string of characters "ABE," such algorithms will return an output denoting the string "AB" as unmodified, the string "C" as deleted, and the string "E" as inserted. Given the original string "ABC" and the modified string "ABC," such algorithms will return an output denoting the string "ABC" as unmodified. Thus, such algorithms can easily compute deltas between one-dimensional string sequences.

However, basic string delta computation is not amenable to documents, spreadsheets, or presentations as is, because there are often complex and nested structures in documents, often stored in binary format. Documents and spreadsheets can be stored in memory as hierarchical structures. One type of hierarchical structure that may be used is a document object model "DOM."

FIG. 3 schematically illustrates a document object model (DOM) 300 used to edit and render a document file. A document file may refer to a file containing a word processing document, a spreadsheet document, a presentation document, a drawing document, a database document, a HTML document, an XML document, an image document, a text document, or any other document file containing user data. In the DOM 300, objects of the document 305 are arranged as nodes in a hierarchy. An object may be a feature of the file. A node may have one or more nodes below it in the hierarchy, and a node may have one or more nodes above it in the hierarchy. For example, node 315 has node 320 below it and node 310 above it. Similar nodes may be at the same level in the hierarchy. For example, nodes 330, 340, and 350 may be at the same level in the hierarchy. In one example, a model-view-controller (MVC) implementation is used to create and edit the DOM 300, and to display the contents of the DOM 300 to a user. In this example, the model portion of the MVC parses a file and places sections of the file corresponding to objects of the document 305 into nodes of the DOM 300.

For example, a paragraph may be placed into node 350 of the DOM 300, and a sentence in the paragraph may be placed in node 355. One word of the sentence may be placed into node 360, and another word may be placed into node 365. Another sentence of the paragraph may be placed into node 370, with its words placed in nodes 375 and 380. For clarity of illustration, only two sentence nodes and four word nodes are described above and in FIG. 3, but a paragraph may have any number of sentences and corresponding sentence nodes, and a sentence may have any number of words and corresponding word nodes. In another example, a table may be placed into the node 350 of the DOM 300, with table row elements placed in nodes 355 and 370. The contents of each cell in the table rows may be placed in nodes 360, 365, 375, and 380, respectively. Tables may have any number of rows and row nodes, and rows may have any number of cell nodes, but two row nodes and four cell nodes are described here for clarity of illustration. In another example, tables may be placed into the DOM 360 with columns as the primary index. In this example, nodes 355 and 370 correspond to columns of the table, and nodes 360, 365, 375, and 380 correspond to contents of each cell in the table columns. In an example, node 310 may contain header information of the document. Node 315 may contain a sentence of the header, and node 320 may contain a word of the header sentence.

For clarity of illustration, node 310 has only one subordinate node 315, which itself has only one subordinate node 320. Furthermore, as illustrated, the DOM 300 has four levels of hierarchy. However, any node in a DOM may have any number of subordinate nodes, and a DOM may have any number of levels of hierarchy.

After the model portion creates the DOM 300 and places contents into nodes, the view portion of a MVC may then traverse node-by-node through the DOM 300 and render some or all of the objects contained in the nodes of the DOM 300. The view portion may be a rendering engine. As the view portion traverses through each node of the DOM 300, it will render the contents of the node if it is configured to do so. The view portion may use hard-coded logic to decode or parse the contents of each node as it encounters the node while traversing. If the hard-coded logic is configured to decode or parse the contents of the node, the view portion will render the contents of the node for display to a user. If the hard-coded logic is not configured to decode or parse the contents of the node, the view portion will not render the contents of the node and will traverse to another node. In an example, the view portion may traverse through the DOM 300 concurrently while the model portion is creating or updating the DOM 300.

The controller portion of a MVC may interact with the view portion and the model portion of the MVC to facilitate editing of the document 305 represented by the DOM 300. When a user provides an editing input, the controller receives the input, determines the node of the DOM 300 to which the input corresponds, and updates the corresponding node. The controller then instructs the view portion of the MVC to render the updated node. The update to the DOM 300 must be validated for correctness. This validation may occur before or after the view portion renders the updated node. In an example, the controller may perform optimistic updating of the DOM 300. In this example, the controller portion sends the update directly to the view portion for immediate rendering, and asynchronously updates and validates the DOM 300. If the validation is successful, no further action is taken with regards to the update. If the validation is unsuccessful, the update to the DOM 300 is reversed, and the view portion renders the DOM 300 as it existed prior to the update. Such optimistic updating provides faster displaying of user edits. By classifying features of the document 305 in a hierarchical structure, the view and controller portions can efficiently interact with the DOM 300 to display and edit the document 305.

FIG. 4 depicts a snapshot 400 of a document stored at one point in time, and another snapshot 450 of the same document stored at a later point in time. FIG. 4 also depicts a flattened snapshot 430 of the snapshot 400 and a flattened snapshot 480 of the snapshot 450. The snapshot 400 includes three paragraphs 406, 412 and 420. The paragraph 406 includes two sentences 402 and 404. The paragraph 412 includes two sentences 408 and 410. The paragraph 420 includes three sentences 414, 416 and 418. The snapshot 450 includes three paragraphs 456, 462, and 470. The paragraph 456 includes two sentences 452 and 454. The paragraph 462 includes an image 472 and two sentences 458 and 460. The paragraph 470 includes three sentences 464, 466 and 468. An example described herein computes deltas between the snapshots 400 and 450, which are loaded-in-memory versions of the documents, and are stored as nested arrays of heterogeneous elements. According to an example, deltas can be computed by performing a process that performs "flattening" on the tree structure of a document such that it can be reduced to a string. The document flattening module 126 can perform document flattening by implementing the following steps. First, the flattening module traverses the document recursively, and constructing nodes representing all the attributes that are significant to computing deltas. Second, the flattening module employs a serializer individually on all top level nodes. One such serializer might be a JSON ENCODER. This process transforms the tree into an array of strings.

FIG. 4 depicts the output of the document flattening module 126. The document comparison module 126 performs a mapping of the sentences of the snapshot 400 to alphanumeric characters to produce the flattened snapshot 430. A sentence that is identical to a previously-mapped sentence will be mapped to the same alphanumeric character as the previously-mapped sentence. A sentence which is not identical to a previously-mapped sentence will be mapped to a unique alphanumeric character. While a single alphanumeric character is described herein as the mapping target, strings of multiple alphanumeric characters may be used instead. The flattened snapshot 430 contains three sets of unique characters 432, 434, 436. The flattened snapshot 430 also contains characters representing unique paragraphs 438, 440, and 442. To generate the set of characters 432, the sentence 402 is represented by the character "M" and the sentence 404 is represented by the character "N." Since these are non-identical sentences, they are mapped to different alphanumeric characters. Likewise, the set of characters 434 is generated by mapping the sentence 408 to the character "O" and the sentence 410 to the character "P." Furthermore, the set 436 is generated by mapping the sentence 414 to the character "Q," the sentence 416 to the character "R," and the sentence 414 to the character "S." The set 432 is itself mapped to the unique alphanumeric character "T" 438. The set 434 is not identical to the set 432, so the set 434 is mapped to a unique alphanumeric character "U" 440. The set 436 is not identical to either the set 432 or the set 434, so the set 436 is mapped to another unique alphanumeric character "V" 442.

The document flattening module 126 generates the flattened snapshot 480 from the snapshot 450 in a similar manner. The document flattening module 126 maps the sentence 452 to the character "M" and the sentence 454 to the character "N" to produce the set 482. The document flattening module 126 maps the image 472 to the character "I," the sentence 458 to the character "O," and the sentence 460 to the character "P" to generate the set 484. The document flattening module 126 maps the sentence 464 to the character "Q," the sentence 466 to the character "X" and the sentence 468 to the character "S" to generate the set 486. Since the sentence 452 is identical to the sentence 402, both sentences receive the same character "M." Likewise, sentences 458, 460, 464, and 468 are identical to sentences in the previous snapshot 400, and each of the sentences is not assigned a unique character, but rather is assigned the same alphanumeric character as its matching sentence. Since the image 472 and the sentence 466 do not appear in the snapshot 400, they are assigned new, unique alphanumeric characters. The document flattening module 126 further flattens the sets 482, 484, and 486 into unique alphanumeric characters. Since the set 482 is identical to the set 432, the set 482 is assigned to the same alphanumeric character, "T" 488. Since the set 484 is different from the set 434 and all previously-mapped sets, the set 484 is assigned a new, unique alphanumeric character, "W" 490. Likewise, since the set 486 is different from the set 436 and all other sets, the set 486 is mapped to the new, unique alphanumeric character "Y" 492.

After the document flattening module 126 has produced flattened snapshots from document snapshots, the document comparison module 124 can then compute a delta between the two snapshots by applying one-dimensional document delta algorithms.

Thus, the flattening module is capable of reducing this problem to be one of comparing complex nested structures to a simple comparison of the strings "TUV" to "TWY", by making it amenable to applying the standardized longest common subsequence algorithm (e.g., DIFF_MATCH_PATCH). Once the delta has been computed over the simple flattened strings, what the delta means is reconstructed in document space by inverting the mapping. This approach is also amenable to alternative tree structured document formats or DOM hierarchies, including but not limited to spreadsheets, presentations, PDF files and CAD files.

Application-generated files can have higher-order dimensionality. For example, a spreadsheet has an additional order of dimensionality as compared to a word processing document. Data in these higher-dimensional documents is often manipulated in ways specific to the higher dimensionality. For example, in a spreadsheet, a user can perform operations such as adding rows, moving rows, deleting rows, copying rows, adding columns, moving columns, deleting columns, and copying columns. A naive approach which forms this data into a series of rows can fail because many operations affect both many columns and many rows.

According to an example, a document comparison system 120 may compare two spreadsheet snapshots S1 and S2 as follows. First, the document flattening module 126 traverses the spreadsheet S1, one row at a time. Next, the document flattening module 126 maps each row in the snapshot to an alphanumeric character (and maps to a new, unique alphanumeric character if the row is not identical to a previously-mapped row). Next, the document flattening module 126 adds each mapped alphanumeric character to a set S1_HORIZONTAL.

Then, the document comparison module traverses the snapshot S2, one row at a time. The document flattening module 126 maps each row in the snapshot S2 to an alphanumeric character (and maps to a new, unique alphanumeric character if the row is not identical to a previously-mapped row). Next, the document flattening module 126 adds each alphanumeric character encountered to a set S2_HORIZONTAL. Then, the document comparison module 124 computes the cardinality of the intersection of sets S1_HORIZONTAL and S2_HORIZONTAL. Computing the cardinality of the intersection of sets includes computing the number of shared elements, as will be described in further detail below.

To proceed column-wise, the document flattening module 126 traverses the spreadsheet snapshot S1, one column at a time. Next, the document flattening module 126 maps each column in the snapshot S1 to an alphanumeric character (and map to a new, unique alphanumeric character if the row is not identical to a previously-mapped row). Next, the document flattening module 126 adds each alphanumeric character encountered to a set S1_VERTICAL. Then, the document flattening module 126 traverses the spreadsheet snapshot S2, one column at a time. Next, the document flattening module 126 maps each column in an input sheet to an alphanumeric character (and map to a new, unique alphanumeric character if the row is not identical to a previously-mapped row). Next, the document flattening module 126 adds each alphanumeric character encountered to a set S2_VERTICAL. Finally, the document comparison module 124 computes the cardinality of the intersection of sets S1_HORIZONTAL and S2_HORIZONTAL.

Figure 5:
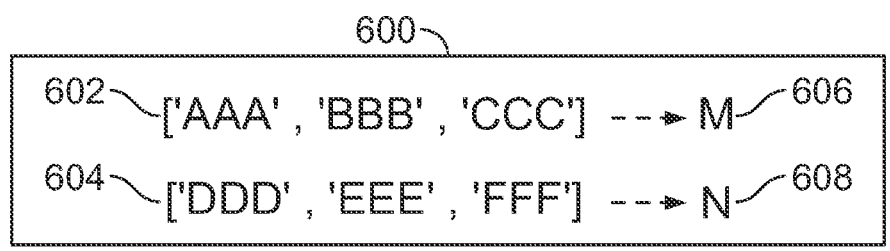
FIG. 5 depicts snapshots of a spreadsheet document, according to an illustrative implementation.

FIG. 5 depicts two snapshots 500 and 550 of a spreadsheet document. The snapshot 500 contains the cells 502, 504, 506, 508, 510, and 512. The snapshot 550 contains the cells 552, 554, and 556. The snapshot 550 is identical to the snapshot 500, except that a row has been deleted.

Figure 6:
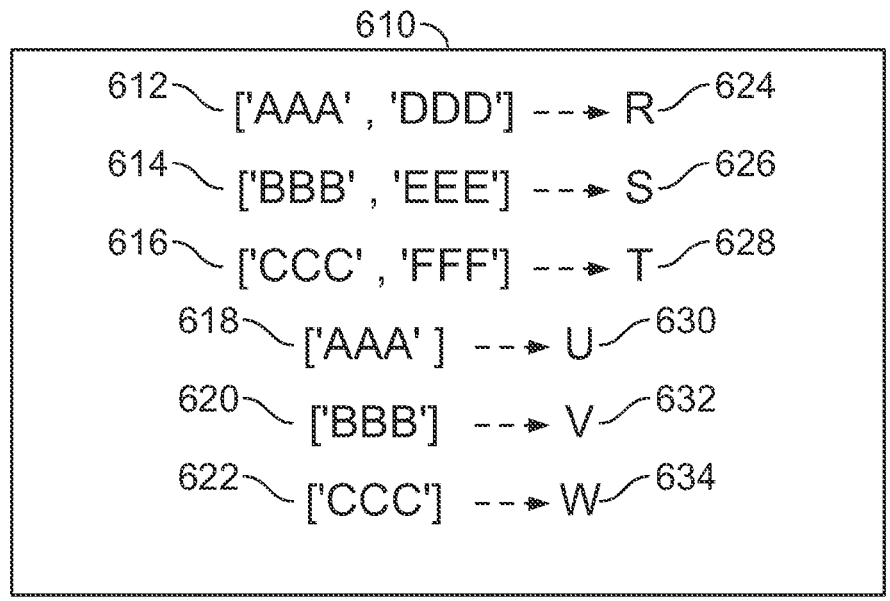
FIG. 6 depicts operation of a document flattening module, according to an illustrative implementation.

FIG. 6 depicts the operation of the document flattening module 126 when operating on the snapshots 500 and 550. FIG. 6 depicts flattened snapshots 600 and 610. The flattened snapshot 600 is a row-wise flattening of the snapshots 500 and 550. The flattened snapshot 600 contains two sets of characters, 602 and 604. The sets 602 and 604 contain unique rows. The first row of the snapshot 500 is represented by the set 602, and the second row of the snapshot 500 is represented by the set 604. Since the first row of the snapshot 550 is identical to the first row of the snapshot 500, the first row of the snapshot 550 is mapped to the set 602. The set 602 is itself mapped to the alphanumeric character "M" 606. The set 604 is mapped to the unique alphanumeric character "N" 608. Thus, the snapshot 500 can be represented as "MN," while the snapshot 550 can be represented by the alphanumeric character "M."

The flattened snapshot 610 represents a column-wise flattening of the snapshots 500 and 550. Columns A, B, and C of the snapshot 500 are mapped to the sets 612, 614, and 616, respectively. Columns A, B, and C of the snapshot 550 are mapped to the sets 618, 620, and 622, respectively. The sets 612, 614, 616, 618, 620, and 622 are mapped to the unique alphanumeric characters 624, 626, 628, 630, 632, and 634, respectively. Since none of the columns of snapshots 500 and 550 are identical to one another, the sets are each mapped to unique alphanumeric characters. Even though, for example, column A of snapshot 500 and column A of snapshot 550 share a cell in common, the columns differ by the deletion of the second row. Thus, the columns are not identical.

Figure 7:
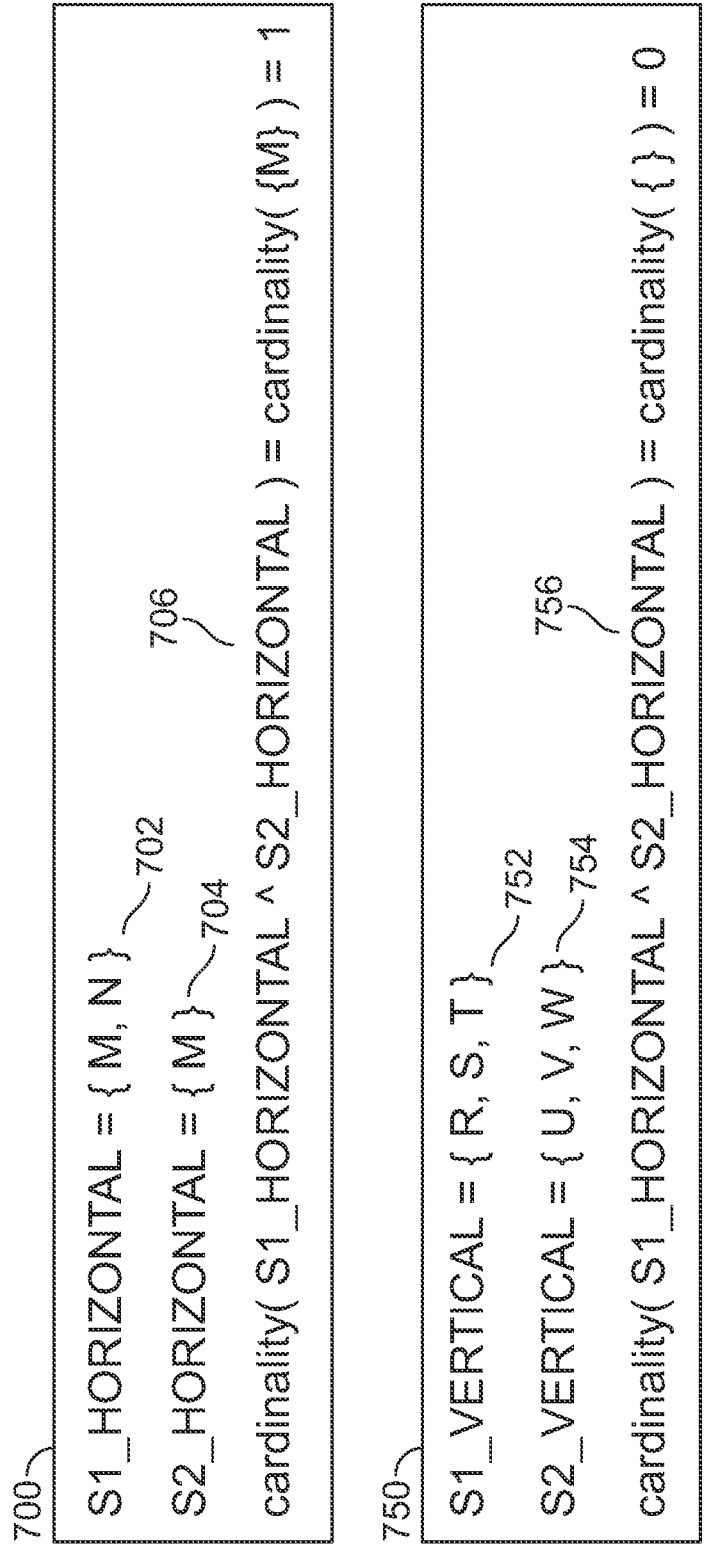
FIG. 7 depicts row-wise sets and column-wise sets of flattened snapshots, according to an illustrative implementation.

Next, the document comparison module 124 computes the cardinality of the intersection of sets in the flattened snapshots 600 and 610. FIG. 7 depicts row-wise sets and column-wise sets of the flattened snapshots 600 and 610, and their respective cardinalities. FIG. 7 includes a row-wise mapping 700 and a column-wise mapping 750. The row-wise mapping 700 includes a set S1_HORIZONTAL 702 representing the snapshot 500 and a set S2_HORIZONTAL 704 representing the snapshot 550. The set 702 contains the characters "M" and "N," each of which represents a row in the snapshot 500. The set 704 contains a single character "M," which represents the single row in the snapshot 550. The row-wise mapping 700 also contains the computed cardinality 706. The cardinality 706 of the intersection of sets 702 and 704 is one the symbol "∩" represents the intersection operator. The cardinality 706 is 1 because the sets 702 and 704 share one element, namely "M."

The column-wise mapping 750 contains the column-wise sets 752 and 754. The column-wise set 752 represents the columns of the snapshot 500, as mapped to alphanumeric characters according to the mapping 610. The column-wise set 754 represents the columns of the snapshot 550, as represented by the column-wise mapping 610. The column-wise mapping 750 also contains the computed cardinality 756 of the sets 752 and 754. Since no elements are shared between the sets 752 and 754, the cardinality of 756 is zero. The cardinality of an intersection of sets represents the degree of overlap between the sets, or, alternatively, the number of shared elements between the sets. When determining whether to compare two snapshots on a row-wise or a column-wise basis, the document comparison module 124 will choose to compare using the basis with the highest cardinality. In the example depicted in FIG. 7, the row-wise basis 700 has the higher cardinality 706. Thus, when comparing the snapshots 500 and 550, the document comparison module 124 will compare these snapshots on a row-wise basis. Accordingly, the document comparison module 124 can compare using the most efficient basis.

FIG. 8 depicts two spreadsheet snapshots 800 and 850. The snapshot 800 represents a spreadsheet with six cells, indexed by rows and columns. The first row of the snapshot 800 contains the cells 802, 804, and 806. The second row of the snapshot 800 contains the cells 808, 810, and 812. The snapshot 850 contains four cells, indexed by row and column. The first row of the snapshot 850 contains the cells 852 and 854. The second row of the snapshot 850 contains the cells 856 and 858.

FIG. 9 depicts a row-wise mapping 900 and a column-wise mapping 920 of the snapshots 800 and 850. The first and second rows of the snapshot 800 are represented by the sets 902 and 904, respectively. The first and second rows of the snapshot 850 are represented by the sets 908 and 910, respectively. The sets 902, 904, 908, and 910 are mapped to the alphanumeric characters 912, 914, 916, and 918, respectively, using systems and methods described with respect to FIG. 6. The mapping 920 represents a mapping of the columns of the snapshots 800 and 850 to unique alphanumeric characters. The first, second, and third columns of the snapshot 800 are represented by the sets 922, 924, and 926, respectively. Since the first column, "Column A" of the snapshot 850 is identical to the first column of the snapshot 800, the first column of snapshot 850 is also represented by the set 922. Likewise, since the second column of the snapshot 850 is identical to the second column of the snapshot 800, the second column of the snapshot 850 is also represented by the set 924. The sets 922, 924, and 926 are mapped to the unique alphanumeric characters 928, 930, and 932, respectively, using systems and methods already described with respect to FIG. 6.

Figure 10:
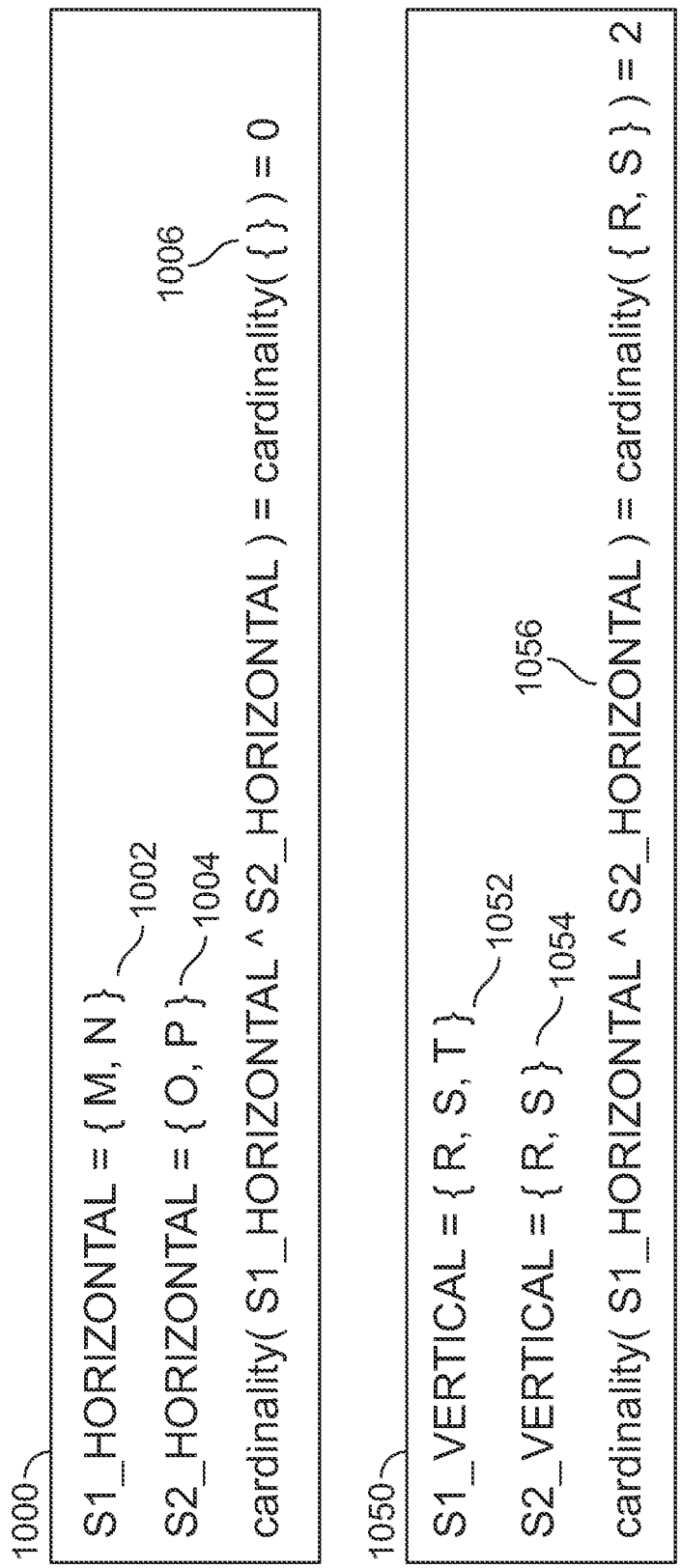
FIG. 10 depicts row-wise sets and column-wise sets of flattened snapshots, according to an illustrative implementation.

Next, the document comparison module 124 computes the cardinality of the intersection of sets in the flattened snapshots 900 and 910. FIG. 10 depicts row-wise sets and column-wise sets of the flattened snapshots 900 and 910, and their respective cardinalities. FIG. 10 includes a row-wise mapping 1000 and a column-wise mapping 1050. The row-wise mapping 1000 includes a set S1_HORIZONTAL 1002 representing the snapshot 800 and a set S2_HORIZONTAL 1004 representing the snapshot 850. The set 1002 contains the characters "M" and "N," each of which represents a row in the snapshot 800. The set 1004 contains the characters "O" and "P," each of which represent a row in the snapshot 850. The row-wise mapping 1000 also contains the computed cardinality 1006. The cardinality 1006 of the intersection of sets 1002 and 1004 is one the symbol "∩" represents the intersection operator. Since no elements are shared between the sets 1002 and 1004, the cardinality of 1006 is zero.

The column-wise mapping 1050 contains the column-wise sets 1052 and 1054. The column-wise set 1052 represents the columns of the snapshot 800, as mapped to alphanumeric characters according to the mapping 910. The column-wise set 1054 represents the columns of the snapshot 850, as represented by the column-wise mapping 910. The column-wise mapping 1050 also contains the computed cardinality 1056 of the sets 1052 and 1054. The cardinality 1056 is 2 because the sets 1052 and 1054 share two elements, namely "R" and "S." The cardinality of an intersection of sets represents the degree of overlap between the sets, or, alternatively, the number of shared elements between the sets. When determining whether to compare two snapshots on a row-wise or a column-wise basis, the document comparison module 124 will choose to compare using the basis with the highest cardinality. In the example depicted in FIG. 10, the column-wise basis 1000 has the higher cardinality 1056. Thus, when comparing the snapshots 800 and 850, the document comparison module 124 will compare these snapshots on a column-wise basis. Accordingly, the document comparison module 124 can compare using the most efficient basis.

The approach employed by the comparison module, as outlined above, also filters out for common classes of minor edits (e.g., sorting a spreadsheet or copying rows), although in some cases where ordering is important, such as a spreadsheet containing priorities of items, instead of a set, one can maintain a dictionary that maps an alphanumeric character corresponding to a row to a list of positions for a row.

In summary, the comparison module may perform a two pass horizontal traversal and vertical traversal of the spreadsheet to identify changed elements, and then discard the larger of the two results. Since the traversal happens to look at content while scanning, we refer to them as content-addressed scans. Also, to ensure that the comparison module can accommodate a large number of rows efficiently, multibyte character encodings such as Unicode may be used. Often spreadsheets have multiple sheets, and a user can add or insert sheets. One can just reduce a spreadsheet to a string and map them to a character sequence, so one can run the standard algorithms.

Figure 11:
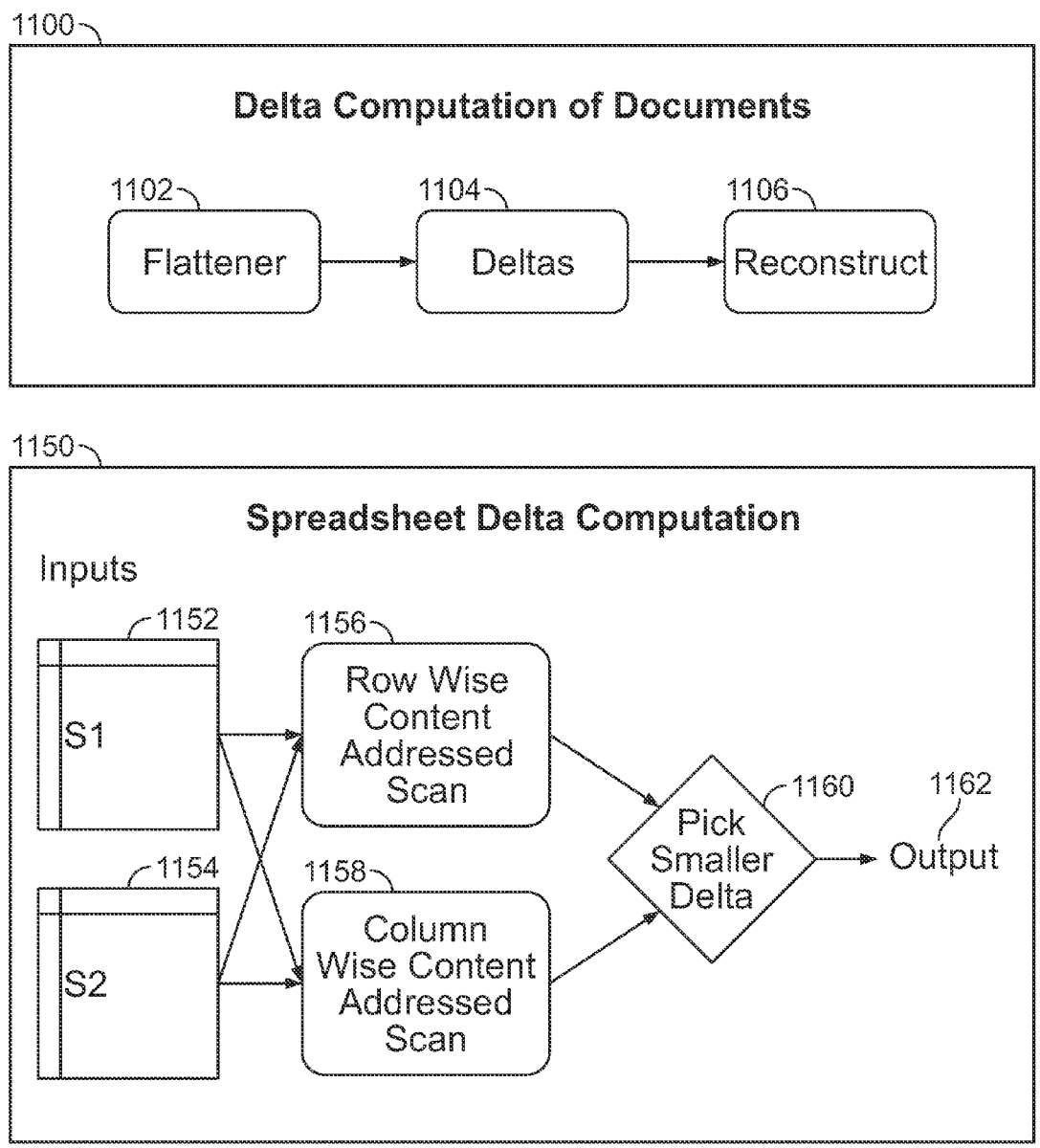
FIG. 11 depicts a flowchart of a method to compute deltas between word processing documents and a flowchart of a method to compute deltas between spreadsheet documents, according to an illustrative implementation.

FIG. 11 depicts a flowchart of a method 1100 to compute deltas between word processing documents and a method 1150 to compute deltas between spreadsheet documents. In the method 1100, at the flattening step 1102, the document flattening module 126 flattens documents into document snapshots. At the delta computation step 1104, the document comparison module 124 computes deltas between the two flattened snapshots. The delta can be represented by the one-dimensional characters which are not shared between the snapshots. At the reconstruction step 1106, the document comparison system 120 reconstructs the modified portions of the snapshots by inverting the mapping used in the flattening step 1102. These reconstructed portions are human-readable and can be presented to a user by an appropriate user interface.

The method 1150 for computing deltas between spreadsheets proceeds as follows. Input spreadsheets 1152 and 1154 are processed by the document flattening module 126. The document flattening module performs both a row-wise content addressed scan 1156 and a column-wise content addressed scan 1158. At step 1160, the document comparison module 124 selects the scan basis with the smaller delta. One way that the document comparison module 124 does this is by selecting the intersection of sets with the higher cardinality, as described with respect to FIGS. 7 and 10. The document comparison module 124 then produces an output 1162 which contains the smaller delta. In this way, the document comparison module computes the deltas between snapshots in the most efficient manner.

Sometimes deltas for a complete document or spreadsheet can be large, and since their primary usage is to ensure that a user can see what has changed without having to look at the entire file, the diff algorithm may, in some examples, be augmented with some enhancements related to improved presentation.

In some examples, the document comparison module 124 performs chunk ranking and filtering for document deltas. Chunk ranking and filtering can be useful to limit the display to the components of a document which have changed significantly. A chunk is a subset of a document, such as a page, paragraph, sentence, word, column, or row. In some examples, the document comparison module 124 (which implements a document delta algorithm) reviews all of the deltas in a document, and ranks the deltas based on the number of changed characters in each delta. Then, the document comparison module 124 selects the N chunks with the largest deltas. The document comparison system 120 then displays a summary containing the N chunks and the corresponding deltas to a user. The UI module 128 may perform this displaying. The number "N" may be selected on the basis of screen size or resolution.

Figure 12:
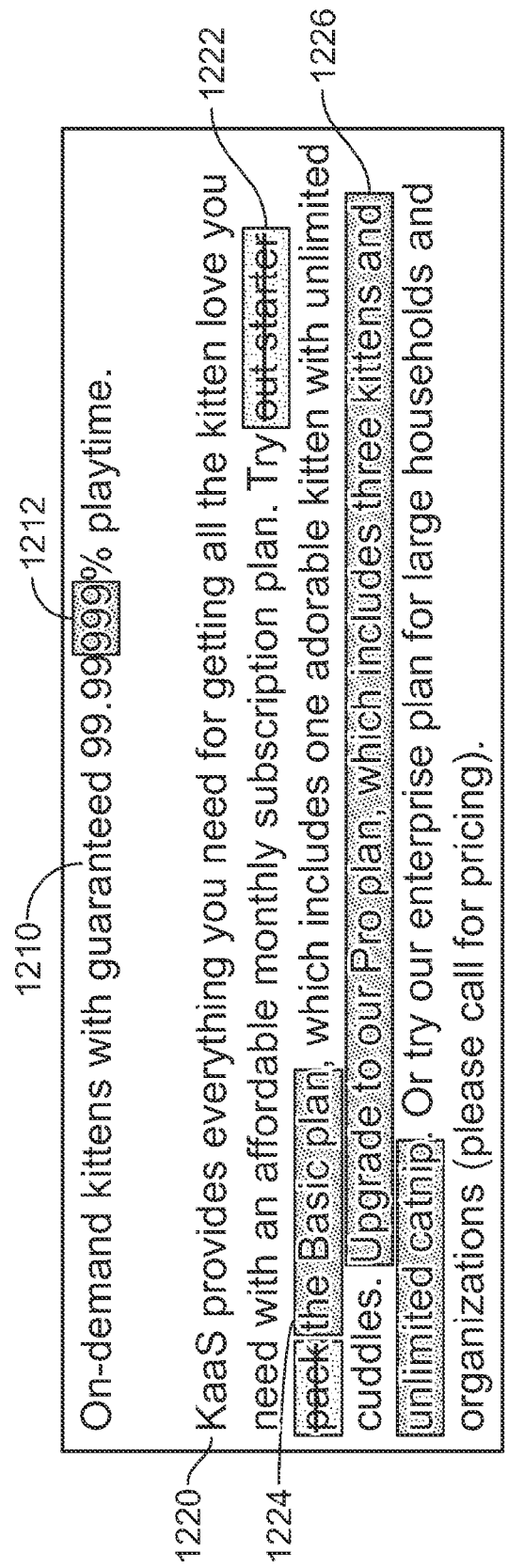
FIG. 12 depicts a user interface displaying a summary of two chunks of a document, according to an illustrative implementation.

FIG. 12 depicts a user interface displaying a summary of the two chunks of a document with the largest deltas. In this example, N=2. FIG. 12 depicts a chunk 1210 corresponding to a sentence and a chunk 1220 corresponding to a paragraph. In the chunk 1210, a text insertion 1212 has been made. The text insertion 1212 comprises an insertion of three characters. In the chunk 1220, which comprises three sentences, a deletion 1222 and two insertions 1224 and 1226 have been made. Chunks of the document which did not contain deltas are omitted from the user interface shown in FIG. 12. In this way, the user can quickly determine which chunks of the document have been changed. In some examples, to aid the user in quickly recognizing which portions of the document have been edited, the UI module 1228 highlights portions of text which have been changed. In these examples, the portions of the text can be highlighted by altering the color of the background surrounding the text, altering the font color of the text, underlining the text, striking through the text, or other modifications to the font, such as type of font, font size, or font emphasis such as italics. In the example depicted in FIG. 12, unmodified text is rendered in a black font color with a white background, inserted text is rendered in a dark green font with a light green background, and deleted text is rendered in a dark red font with a light red background and is stricken through. In other examples, all text may be rendered in a single color with a background of another single color, inserted text may be underlined, and deleted text may be stricken through or enclosed with brackets. In this way, the user can quickly determine which portions of the displayed chunks have been edited.

In some examples, the document comparison module 124 strips and augments the display data to facilitate presentation. In some examples, the document comparison module 124 performs stripping and augmentation when computing deltas between two spreadsheet snapshots. In an illustrative example, the document comparison module 124 computes deltas between two spreadsheet snapshots and determines that only two rows contain changes. These two rows, for example, rows 17 and 18, may be separated from a header row by a number of rows. If the intervening rows were also shown in a user interface, then the user may have difficulty in determining the context of the changes. Thus, for ease of user interpretation, it is valuable to show a header row of the spreadsheet, not show unchanged rows, and show an indicator that makes clear to the user that there is a gap in the rows. The gap in the rows corresponds to the unchanged rows. As such, the document comparison module (and, in one example embodiment, a spreadsheet sub-module) implements an algorithm that also copies the top row of a spreadsheet based on a determination to generate a horizontal delta, and the first column based on a determination to generate a vertical delta, and strips any intermediate unchanged rows.

Figure 13B:
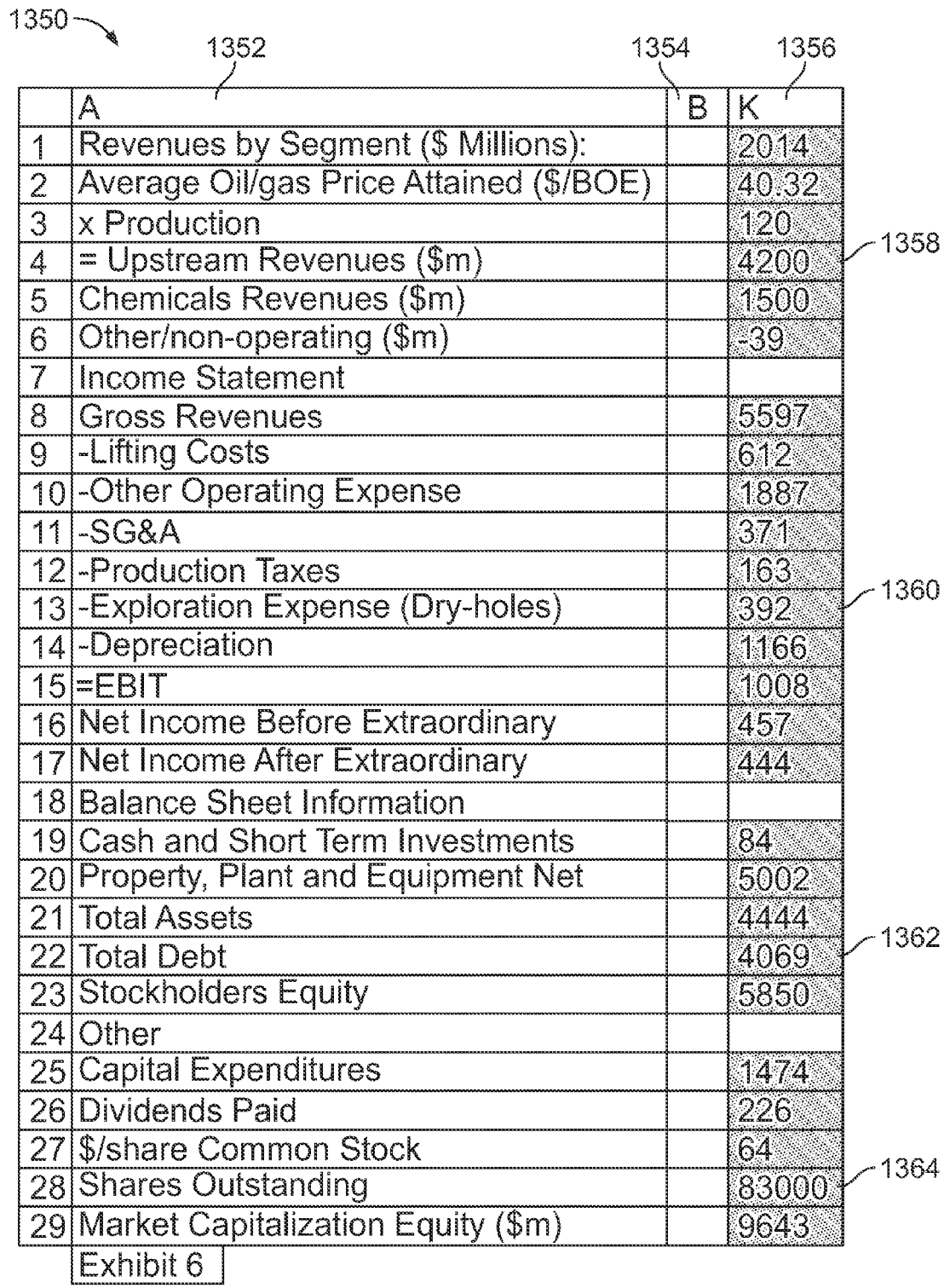

FIGS. 13A and 13B depict examples in which rows and columns have been stripped after performing row and column-wise diffs. FIG. 13A includes a user interface 1300 that depicts deltas as determined by a row-wise diff. In the user interface 1300, a page tear 1304 illustrates to a user that intervening rows which were unchanged have been eliminated from the displayed portion of the spreadsheet. The user interface 1300 includes a header row 1302 to provide context for the changed portions of the spreadsheet. The user interface 1300 also includes rows 1306, 1308, 1310, 1312, and 1314 which contain edited portions 1316, 1318, 1320, and 1322. The edited portions 1316, 1318, 1320, and 1322 are depicted with highlighting, background coloring, strikethrough text, and other font modification to illustrate to the user that these portions have been changed.

FIG. 13B depicts a user interface 1350 that illustrates the results of a column-wise diff computation performed by the document comparison module 124. The user interface 1350 includes a header column 1352, a page tear 1354, and edited column 1356. The edited column 1356 includes changed cells 1358, 1360, 1362, and 1364. The page tear 1354 represents columns B through J which contain unchanged data and are omitted from display in the user interface 1350.

The header column 1352 contains header information that provides context to the changed portions 1358, 1360, 1362 and 1364. By including a header column 1352, the user interface 1350 provides a concise and meaningful representation of the changes to a user.

In some examples, the document comparison system 120 operates on a large collection of documents in cloud storage. In these examples, the document comparison system 120 may compute incremental deltas. In a further example, the document comparison 124 module may generate an activity feed for all files to which a particular user has access. It is advantageous (but nonetheless a technical challenge) to ensure that access to deltas is fast, and efficient in terms of both space and time. Given that fetching and downloading raw data to compute deltas is expensive, according to some examples there is provided a caching layer that incrementally computes deltas to ensure that, when an application (e.g., a website, an online word processor, or mobile app) asks for a delta to show a user what has changed, the application gets a response with minimal delay. Caching layers such as REDIS and MEMCACHE typically take time in the low milliseconds to respond and store objects, and computing deltas, particularly for large files, can take seconds.

Figure 14:
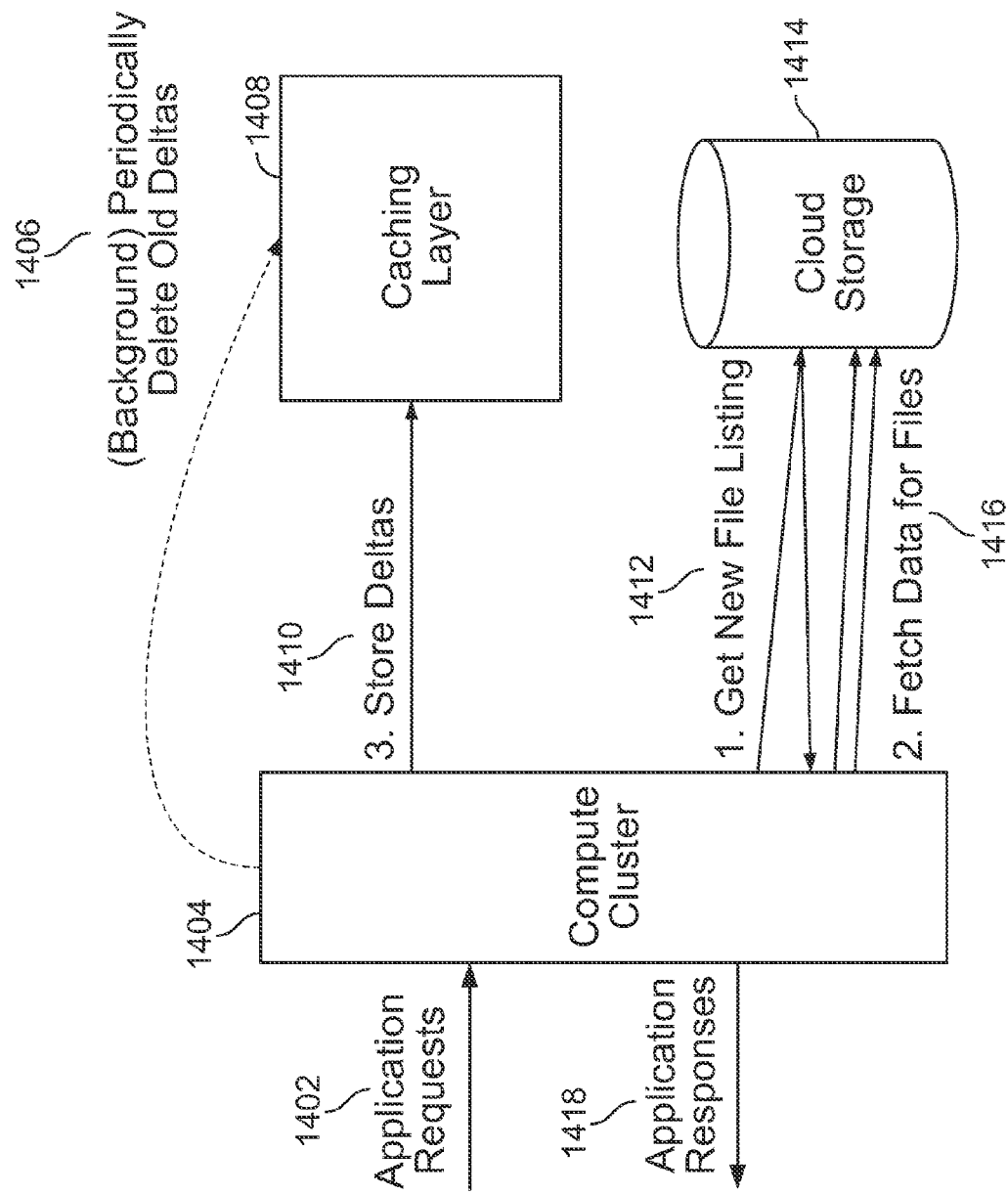
FIG. 14 depicts a system for computing and caching deltas for documents stored in cloud storage, according to an illustrative implementation.

FIG. 14 depicts a system for computing and caching deltas for documents stored in cloud storage. FIG. 14 depicts a compute cluster 1404, a caching layer 1408, and a cloud storage database 1414. The compute cluster 1404 interfaces with applications and performs delta computation, as well as interfacing with the caching layer 1408, and the cloud storage database 1414. The computer cluster may be a server or server processor, a personal computer, or any computing device configured to perform the functions of the compute cluster 1404. The compute cluster 1404 may be a cluster of servers or server blades. The caching layer 1408 stores incrementally computed deltas for fast access by the compute cluster 1404 and may comprise REDIS or MEMCACHE. The cloud storage database 1414 stores the documents for which deltas are computed and snapshots, which are used to compute deltas.

At step 1412, a new file listing is received. The compute cluster then performs step 1416 and fetches the data for the files. The compute cluster computes deltas between the snapshots of the files and, at step 1410 stores the computed deltas in the caching layer 1408. At step 1402, an application requests document deltas. The requesting application may be a cloud service application or other network-based application for which a fast response is desired. The compute cluster 1404 interfaces with the caching layer 1408 to read the latest computed delta from cache, and then, at step 1418 sends a response to the application. The compute cluster 1404 can interface with the caching layer 1408 faster than the compute cluster 1404 could perform an on-demand document delta computation. Accordingly, the speed of the response is increased, and the delay between the response 1418 and the request 1402 is reduced.

At step 1406, a background process walks through all deltas cached in the caching layer 1408 and discards any deltas that are older than a configurable time threshold. In this way, the size of the caching layer is kept to a minimum while retaining the most recent deltas.

In this section, we describe a method, according to some examples implemented by a document comparison module, to cache deltas and to provide up-to-date deltas. Typically cloud services expose a sequence of events with a key representing a monotonically increasing counter for the last event. Assume, for example, a user's events indicate that they have a certain number of events, with the last event having a sequence number of 100.

The methodology implemented by the document comparison module tracks the last sequence number for which the deltas of a user are up to date, and stores 100 in a database for the user's account. Whenever a request comes in to generate a news feed of document updates for a user, the document comparison module looks at the events, and only re-computes deltas for events with a sequence number>100. To surface all activity for one given file, it may be useful to compute multiple deltas for the same file. To support multiple deltas, a cache keying scheme uses a 3-tuple: a unique identifier for the file, an identifier for the old version, and an identifier for the new version.

Figure 15:
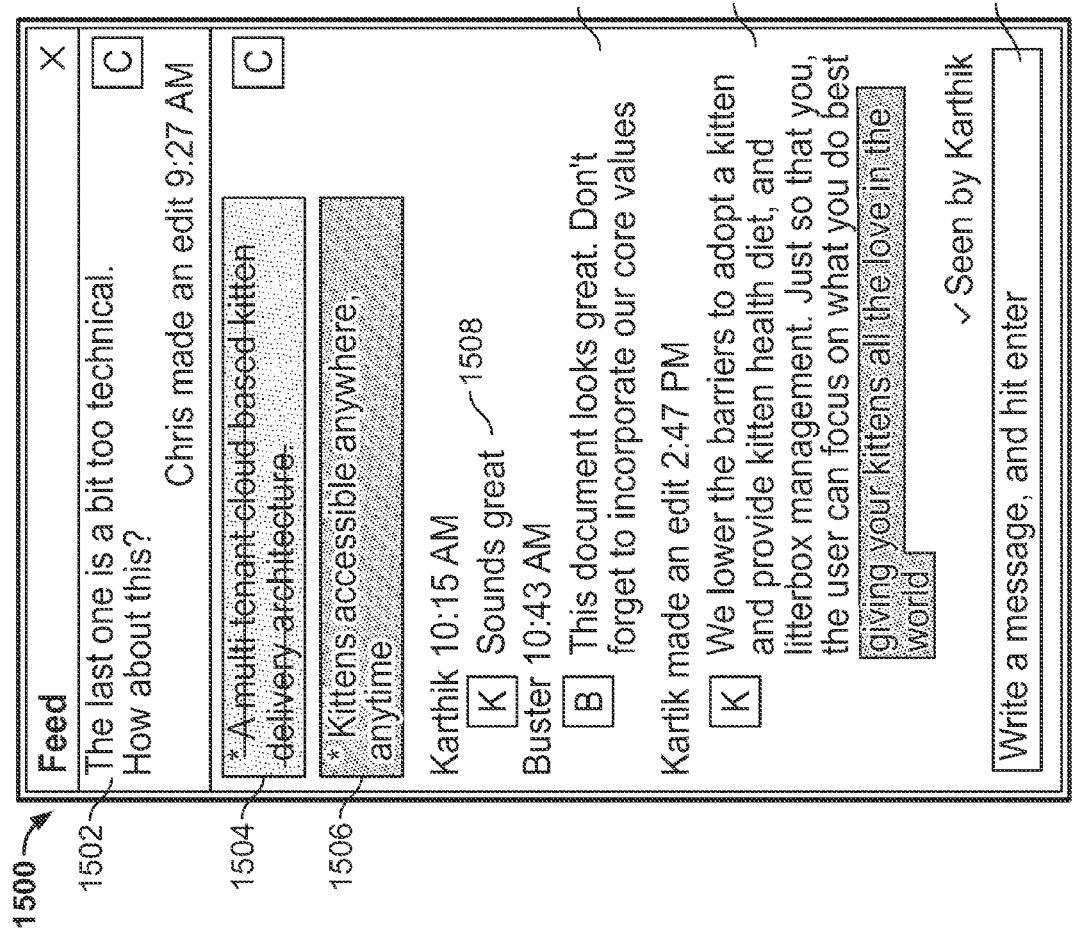
FIG. 15 depicts a feed which contains a summary of changes to a document, according to an illustrative implementation.

FIG. 15 depicts a feed 1500 which contains a summary of changes to a document along with user comments about the document and changes. The feed 1500 includes comments 1502, 1508, and 1510. The feed 1500 also includes changes 1504, 1506, and 1512. The change 1512 is depicted with context of the surrounding text to aid user interpretation of the change. The comments 1502, 1508, and 1510 allow users to communicate regarding the document and the changes. Including these comments in the feed 1500 provides further context for the changes 1504, 1506, and 1512.

While the description below relates to spreadsheets, it will be appreciated that the method is applicable to other document or content types.

In some examples, the document comparison system 120 presents summaries in a format that closely resembles the original document. In the example depicted in FIG. 13, the summary closely resembles its original document type: a spreadsheet. FIG. 13 depicts the highlighting of additions in green and deletions in red with a strikethrough. This makes it easy for a user to quickly scan and recognize the changed portions. Furthermore, the systems and methods described herein can display changes across multiple sheets of a spreadsheet documents or pages of a word processing document. A spreadsheet workbook file may contain dozens sheets, and a word processing document can contain many pages. In some examples, the systems and methods described herein will detect and display the deltas for only those sheets or pages which contain pages.

Figure 16:
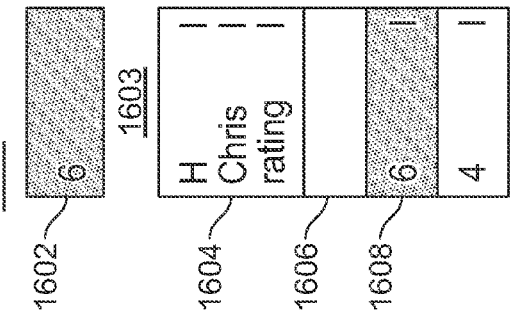
FIG. 16 depicts two user interfaces, according to an illustrative implementation.

The document comparison system 120 can increase the value of presented information by providing contextually relevant portions of a document. FIG. 16 depicts two possible user interfaces 1600 and 1603. In the user interface 1600, only the changed portion 1602 is displayed. A user viewing the user interface 1600 can see that the text "6" was inserted, but the user may not realize the importance of the insertion. The user interface 1603 includes a similar changed cell 1608 but also includes context, in the form of a header row 1604 and a page tear 1606 depicting omitted intervening rows. The insertion of "6" into a cell is meaningless without proper context. As shown in the user interface 1603, the header row 1604 conveys to the user that this "6" refers to Chris' rating.

While this context is useful, it is also useful to display the header column and additional surrounding cells to enable a viewer to fully understand the full meaning of a change. FIG. 17 depicts a user interface 1700 that shows an increased level of context for faster user interpretation. The user interface 1700 includes the insertion of the text "6" 1708, a header row 1704, and a page tear 1706 showing intervening rows that are omitted, and also shows surrounding cells. As shown in FIG. 17, the inserted "6" 1708 is Chris' rating for a particular bottle and vintage of wine. With the full context that this example method provides, the user can now understand the meaning of this inserted "6" 1708. Specifically, the user can understand that "6" 1708 is Chris's rating for a bottle of Penfolds Shiraz of vintage 2012.

The method, according to some examples, parses and understands the layout of the document, and the location of the change(s). The method then provides a determined amount of contextually relevant information to make sense of the change. The method balances the need for context and meaning with keeping the document delta succinct. The method determines which columns or rows are essential to provide a context-relevant perspective with respect to a specific change. In some examples, such as the user interface 1300 of FIG. 13, the method displays a header row to provide context. In some examples, such as in the user interface 1350, the document comparison system 120 only displays a header column, rather than a header row.

On mobile devices, news feeds, email, and in other mediums, brevity of information may be desirable in view of limited screen space, but technically challenging to achieve. Simply displaying a full spreadsheet with hundreds of rows or columns would be unusable. The document comparison system 120, according to some examples, accounts for this and optimizes the display for brevity in several example ways.

In the user interface 1700 depicted in FIG. 17, the modifications were made only to the 11th row. Rather than displaying rows 2 through 10, the document comparison system 120, according to example, only displays the header row necessary for context and the rows which contain new changes. The rows that are omitted are represented as a page tear to inform the user that the document comparison system 120 omitted from display irrelevant, unchanged rows. The document comparison system 120 may provide page tears horizontally or vertically, depending on where the crucial context is located.

When very large portions of a spreadsheet are modified, the display of the change can still be large. In some use cases, particularly in feeds, it is desirable to limit the height of any one change, while still allowing the user the option to see the full change. The document comparison system 120 and the UI module 128 provide this ability by collapsing the change if it exceeds a specific height threshold.

As shown in FIG. 18, the user may make a selection to view the full change. FIG. 18 depicts a user interface 1800 that shows a subset of a change. The user interface 1800 includes a clickable portion 1802, the user selection of which triggers the UI module 128 to expand the change in a smooth animation.

For particularly lengthy text, the method may limit the contents of a change. If the change exceeds a threshold, the method cuts off the text and inserts an ellipsis. This can be particularly valuable for mobile or other use cases with very limited screen real estate. As shown in FIG. 18, the change 1804 includes an ellipsis at the end of the displayed portion of the text, which indicates that the full change is not displayed.

The output of this method can be any markup language (e.g. HTML), which can be used and rendered on practically any device or application. FIG. 19 depicts a user interface 1900 as output by the user interface module 128 and rendered for display on a mobile device.

Figure 20:
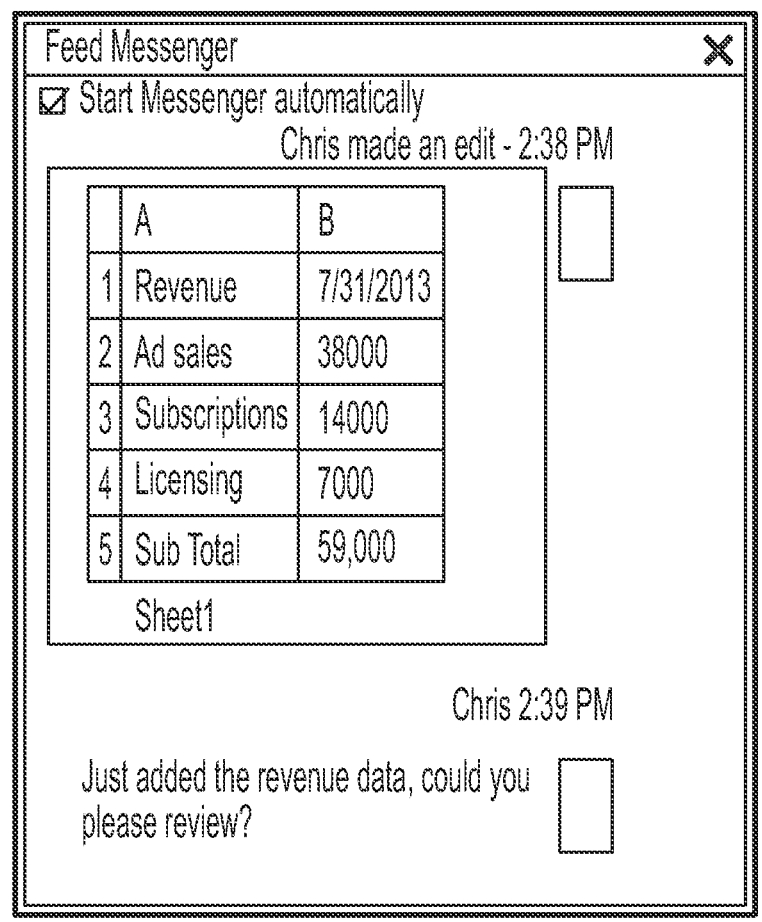
FIG. 20 depicts a user interface showing changes to a spreadsheet document, according to an illustrative implementation.

FIG. 20 depicts a user interface 2000 showing changes to a spreadsheet document and a field for user comments as rendered by the user interface module 128 and displayed on a mobile device.

Figure 21:
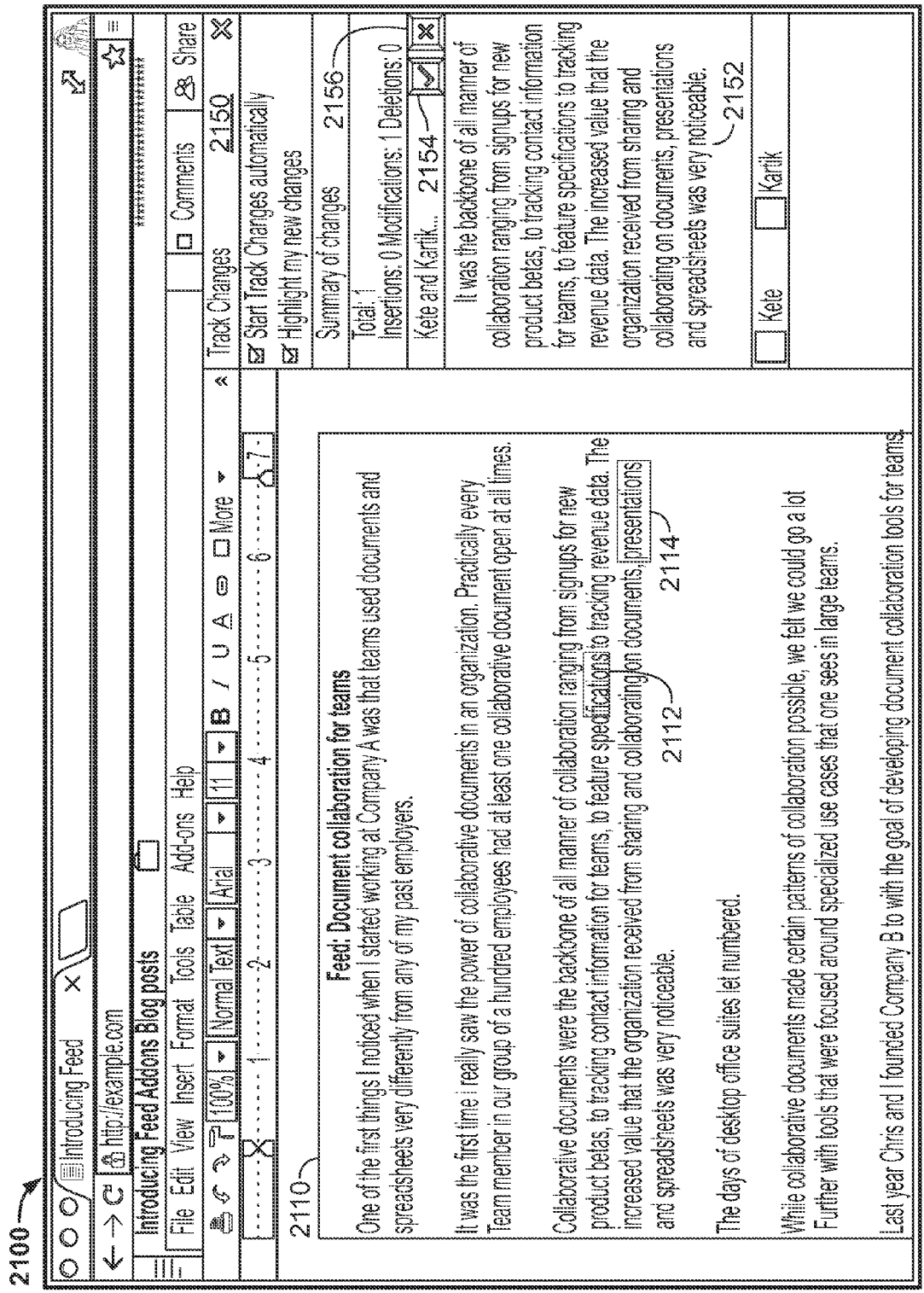
FIG. 21 depicts a user interface that is configured to allow a user to control whether to accept or reject changes or deltas, according to an illustrative implementation.

To give users control of which edits they would like to keep and which edits to discard, the document comparison module 124 may provide a user selective control of which deltas to accept, and which to reject. FIG. 21 depicts a user interface 2100 that is configured to allow a user to control whether to accept or reject changes or deltas. The user interface 2100 includes a document display 2110 and a track changes display 2150. The document display 2110 includes two changes 2112 and 2114. The track changes display 2150 includes a summary of the changes 2152 and clickable areas 2154 and 2156. The clickable area 2154 is an "Accept" button, and user selection of the clickable area 2154 triggers the document comparison system 120 to accept the change and to merge the change into the document. User selection of the clickable area 2156 triggers the document comparison system 120 to reject the change and to delete the corresponding delta from the delta repository 140.

Cloud services expose APIs to get a list of all the elements of a document, and also APIs to alter them.

Figure 22:
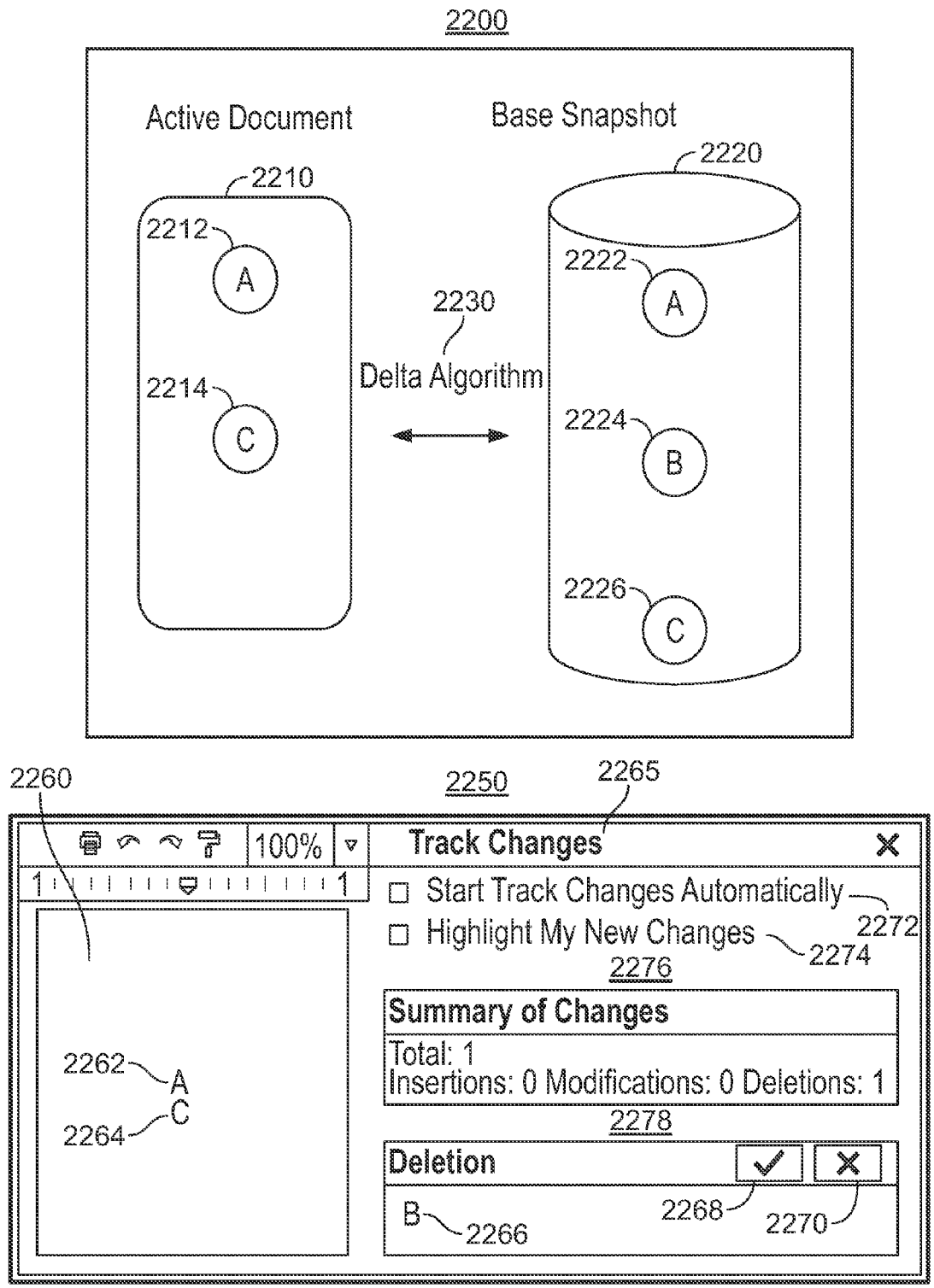
FIG. 22 depicts an example in which a document comparison module inverts deltas, according to an illustrative implementation.

FIG. 22 depicts an example in which the document comparison module 124 (as part of a content management system) inverts deltas. FIG. 22 includes a set of snapshots 2200. The set of snapshots 2200 includes an active document 2210 and a base snapshot 2220. The base snapshot is generated when the document flattening module 126 walks through the tree structure of a document, flattens or serializes it, and stores the serialized or flattened snapshot. This stored snapshot will henceforth be referred to as "the base snapshot" 2220. The active document snapshot 2210 is generated by the document flattening module 126 when the document flattening module 126 walks through the tree structure of the document at a later point in time, serializes or flattens the document, and stores the serialized or flattened document. This snapshot 2210 is a flattened snapshot of the real-time document. The document comparison module 124 periodically computes deltas between the active document snapshot 2210 and the base snapshot 2220 using a diff algorithm 2230. The document comparison system 120 periodically shows these computed deltas to a user. The document comparison module 124 uses the systems and methods described herein to periodically compute these deltas. The base snapshot 2220 contains three paragraphs: A 2222, B 2224, and C 2226. After the document flattening module 126 has flattened the document into the base snapshot 2220, a user of the document comparison system 120 has deleted paragraph B 2224. Thus, the active document snapshot 2210 only contains the paragraphs A 2212 and C 2214. The document comparison system 120 continually compares the base snapshot 2220 to the current or active document snapshot 2210 and generates deltas that a user can accept or reject.

FIG. 22 also depicts an application-level output 2250 of the document comparison system 120. The output 2250 is a user interface that includes a document display 2260 and a track changes display 2265. The document display 2260 depicts the active document and includes a rendering of paragraph A 2262 and paragraph C 2264. The track changes display 2265 includes a clickable portion 2272 which, when clicked, triggers the document comparison system 120 to begin tracking changes, flattening the document into flattened snapshots, and computing deltas. The track changes display 2265 also includes a clickable area 2274, which, when selected by the user, triggers the UI module 128 to highlight new changes. The track changes display 2365 includes a summary of changes 2276, which provides a brief synopsis of the numbers of changes and a breakdown by type of change. The track changes display 2265 also includes a change menu 2278 which receives user input to accept or reject a specific change. The change menu 2278 includes a summary of the change 2266, and two clickable areas, 2268 and 2270. Operation of the change menu 2278 is further explained with respect to FIG. 23.

Figure 23:
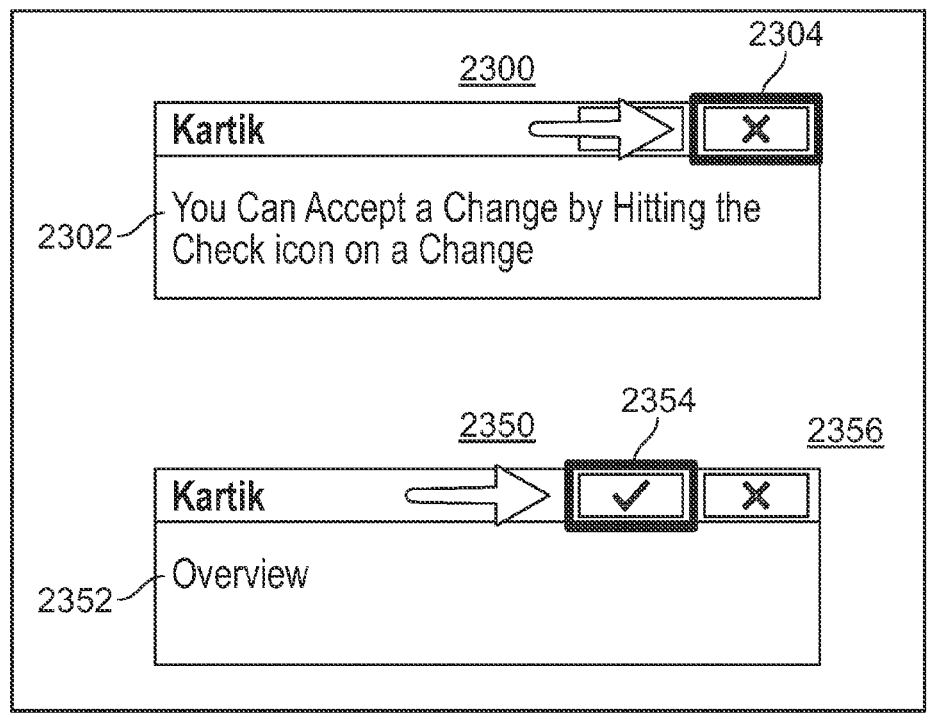
FIG. 23 depicts change menus, according to an illustrative implementation.

FIG. 23 depicts a change menu 2300 and a change menu 2350. The change menu 2300 provides a user interface for receiving an input from a user to invert a change, or in other words, to undo a change. The user interface 2300 includes a summary of the change 2302, an indicator of the user who generated the change, and a clickable area 2304. User selection of the clickable area 2304 triggers the document comparison system 120 to reject the change. Accordingly, the clickable area 2304 is a reject button. The document comparison system 120 rejects a change using the following algorithm. First, the document comparison system 120 recreates a previous version of the element from the base snapshots, inserts the recreated element into the current document at the appropriate offset, and deletes the current element.

The change menu 2350 includes a summary of the change 2352, an indication of the user who generated the change, and clickable areas 2354 and 2356. The clickable area 2354 is an accept button, and when selected by the user, the document comparison system is triggered to accept the change. The clickable area 2356 is a reject button and when clicked, the document comparison system 120 is triggered to reject the change as described with respect to the menu 2300. When a user selects the clickable area 2354 to accept a change, the document comparison system 120 accepts the selected delta 2352 using the following algorithm. First, the document comparison system 120 locates the element containing the delta 2352 in the most recent snapshot of the document. Then, the document comparison system 120 replaces the corresponding element in the base snapshot with the located element accepted by the user. These elements may be deltas or chunks. In this way, the document comparison system 120 can receive inputs from users to accept or reject specific changes in the document.

For the purposes of allowing multiple users to collaborate on a document and also accurately capture who made which edit, one can store metadata on a per character level about who made a change and at what time by encoding it in the colors of the document. To translate the state of a document into who made what edit, one can traverse a document and invert the mapping from color to user/time of edit. This data when surfaced in an application such as a word processor can make it easy for users to collaborate on a document. Colors in most computer systems are represented as 3 channels consisting of 8 bits each, red, green and blue. Since there are a limited number of color bits, and for visual consistency it is important that the edits from the same user retain the same color. Also given most documents have white backgrounds, it's important to have colors which are light.

Figure 24:
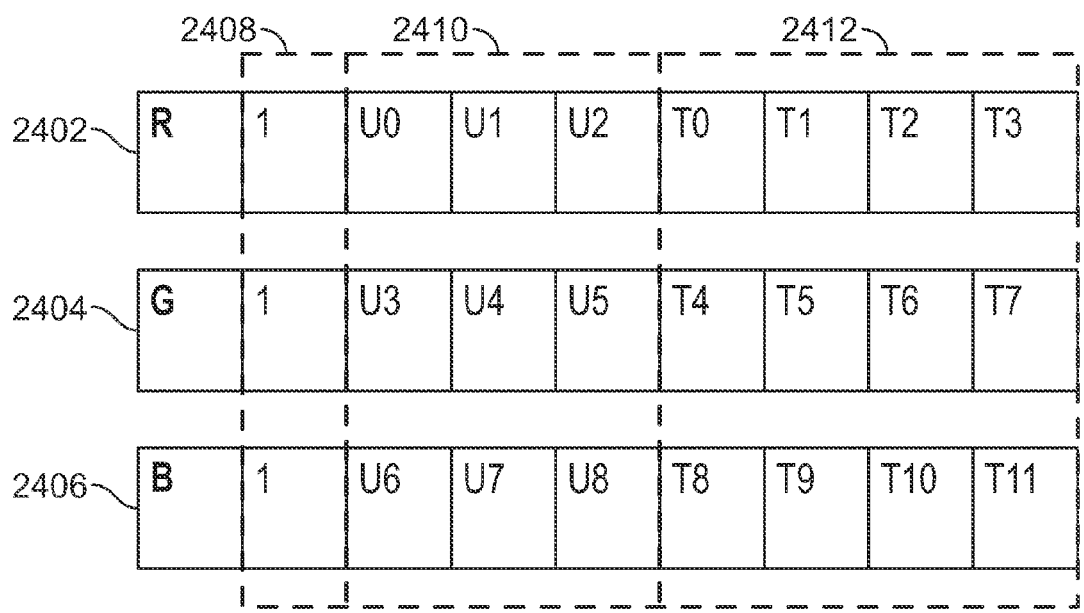
FIG. 24 depicts a mapping of bits used to store metadata, according to an illustrative implementation.

FIG. 24 depicts a mapping of bits used to store metadata including the time and author of a change. FIG. 24 depicts an example in which red, green, and blue channels are used to represent colors of text in a document. FIG. 24 includes a red channel 2402, a green channel 2404, and a blue channel 2406. Each of the channels 2402, 2404, and 2406 are 8-bit channels, meaning that the proportion of color represented by a channel can be represented on a scale from 0 to 255, or $2^8$. The UI module 128 assigns values to each of the bits in the channels 2402, 2404, and 2406 in the following way. First, the most significant bit in each channel 2408 is set to 1. This limits the emitted colors to be light, white, background-friendly colors. Second, the user interface module 128 represents a user's user ID identifier by mapping it to a 9-bit number. The UI module 128 stores the 9-bit number as bits U-0 through U-8, represented by the block of bits 2410. Third, the UI module 128 represents the time of the edit by mapping the time to a 12-bit number representing hour of year. The user interface module 128 stores the mapped 12-bit number in bits T-0 through T-11, represented by the block of bits 2412. This mapping results in a precision of three hours, but in practice given cloud service APIs, the document comparison system 120 can compute an intersection of the last time a revision was made by a given user within a three hour window and obtained fine-grained results for the time of edit. In this way, the color in which a change is displayed can provide information regarding the user and the time of the edit. Encoding this information into the color can allow users to determine author and time of edit, and also provides a means of encoding this information within the edit in a compact fashion.

Figure 25:
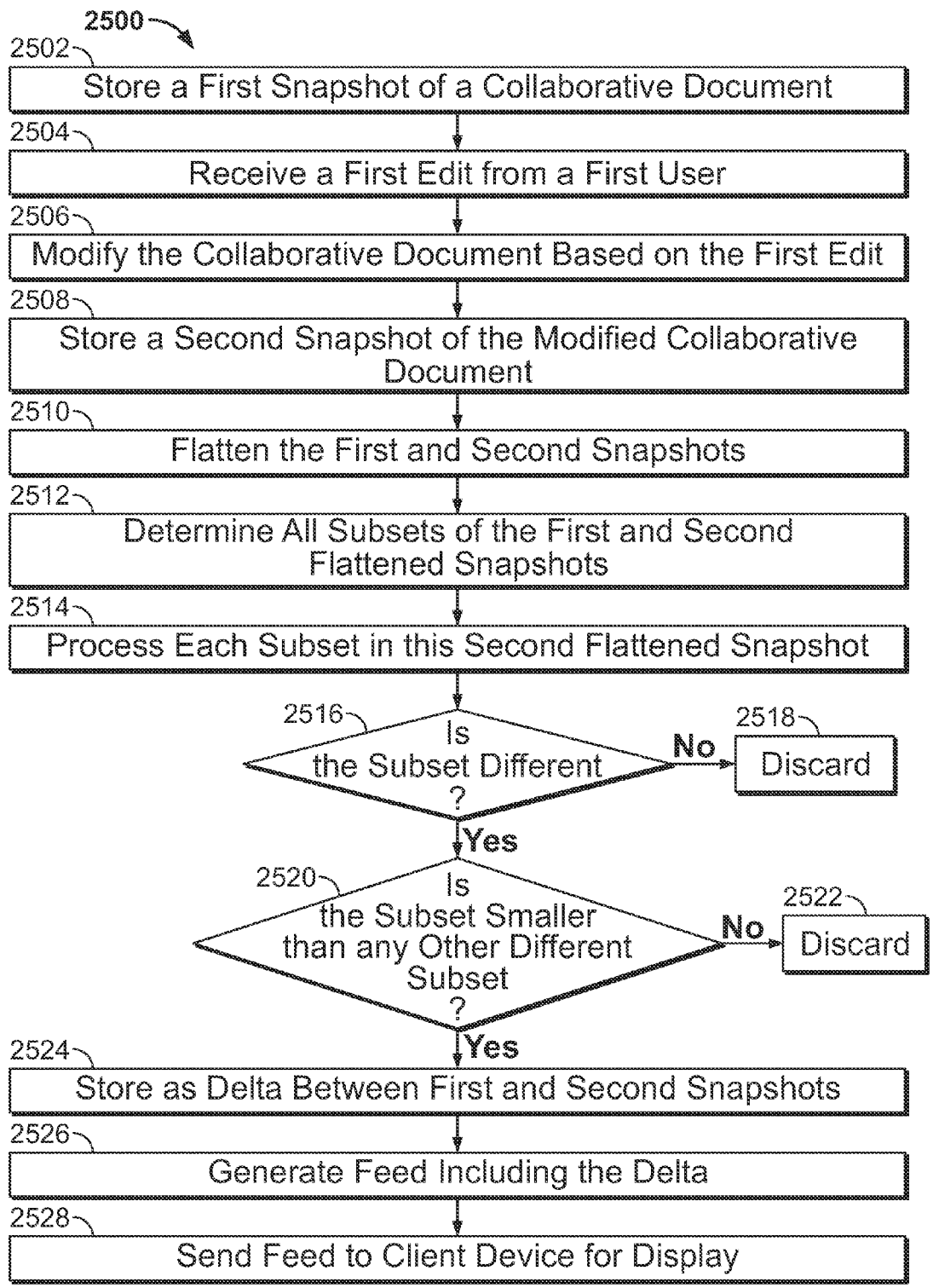
FIG. 25 depicts a flowchart of a method used by the document comparison system to compute deltas and generate a feed for display to a user, according to an illustrative implementation.

FIG. 25 depicts a flowchart of a method 2500 used by the document comparison system 120 to compute deltas and generate a feed for display to a user. At step 2502, the document comparison system 120 computes and stores a first snapshot of a collaborative document hosted on a server. At step 2504, the document comparison system 120 receives a first edit to the collaborative document from a first user. At step 2506, the document comparison system 120 modifies the active version of the collaborative document based on the first edit. At step 2508, the document comparison system 120 stores a second snapshot of the modified collaborative document, which reflects the results of the first edit. At step 2510, the document comparison system flattens the first and second snapshots into flattened snapshots. This flattening can occur immediately after step 2508, or the document comparison system 120 can flatten the first snapshot into a first flattened snapshot at any time after step 2502. At step 2512, the document comparison system 120 determines all subsets of the first and second flattened snapshots. These determined subsets may or may not be the most compact representation of the changes, and the method 2500 continues to determine the most compact representation. At step 2514, the document comparison system 120 processes each subset of the second flattened snapshot as follows. At the decision block 2516, the document comparison module 124 determines if the subset in question is different from the corresponding subset of the first flattened snapshot. If the corresponding subset of the first flattened snapshot is not different from the subset in question of the second flattened snapshot, the method proceeds to step 2518, where the subset in question of the second flattened snapshot is discarded.

If, at decision block 2516, the document comparison system 120 determines that the subset in question of the second flattened snapshot is different from the corresponding subset of the first flattened snapshot, the method proceeds to decision block 2520. At decision block 2520, the document comparison module 124 determines if the subset in question of the second flattened snapshot is smaller than any other subset which is determined to be different. If the subset in question is not smaller, then the method proceeds to step 2522, where the subset is discarded.

If, at step 2520, the document comparison module 124 determines that the subset in question is smaller than any other different subset, the method proceeds to step 2524. At step 2524, the document comparison module 124 stores the subset in question as a delta between the first and second snapshots. At step 2526, the feed module 132 generates a feed which includes the delta. At step 2528, the UI module 128 sends the generated feed to a client device for display to a user. The generated feed may be included in any of the user interfaces as depicted in FIGS. 12, 13, and 15-23.

Figure 26:
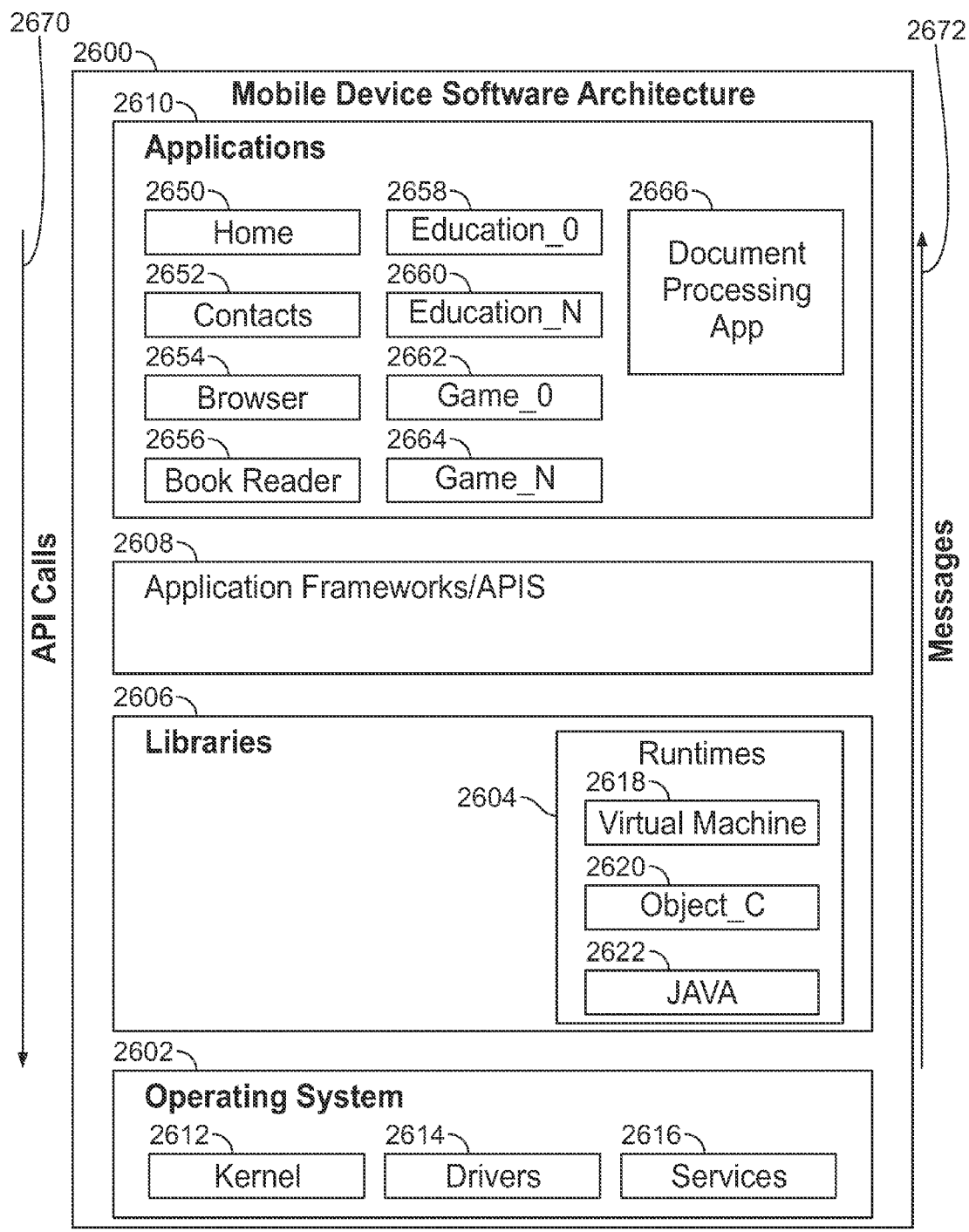
FIG. 26 is a block diagram illustrating an architecture of mobile device software, according to an illustrative implementation.

FIG. 26 is a block diagram illustrating the architecture of mobile device software 2600, which may be installed on any one or more of the mobile devices used to perform part, or all of the example methods discussed above.

The mobile device software 2600 is composed of a software stack of different layers, namely operating system layer 2602, runtimes 2604, libraries 2606, application frameworks/APIs 2608 and applications 2610. The operating system layer 2602 includes one or more kernels 2612, drivers 2614 and other services 2616.

The kernel 2612 acts as an abstraction layer between the hardware of a mobile device, and the other software layers. For example, the kernel 2612 may be responsible for memory management, process management, networking, security settings, etc. The drivers 2614 are responsible for controlling communication with the underlying hardware (e.g., for facilitating communication with Bluetooth hardware that may be used for NFC tag identification). The drivers 2614 may include a display driver, camera driver, Bluetooth driver, flash memory driver, a USB driver, a keypad driver, a Wi-Fi driver, audio drivers and a power management driver.

The runtimes 2604 may include virtual machines 2618 (e.g., the Dalvik Virtual Machine or a Java Virtual Machine). Other example runtimes may include Objective-C runtime 2600, which includes both the Objective-C dynamically-linked runtime libraries and the underlying C libraries.

The libraries 2606 enable a mobile device to handle different types of data. The libraries 2606 may be written in C/C++ and are accessed via Java interfaces. The libraries 2606 include a surface manager for compositing windows, 2D and 3D graphics, media codex (e.g., MPEG4, H2664, MP3 etc.) and SQL database (e.g., SQL light) and a native web browser engine (e.g., WebKit). Example libraries include a surface manager library that enables direct drawing on the screen, a media framework that provides media codecs allowing for the recording or playback of different media formats (e.g., MPEG4, H2664, MP3 etc.), an OpenGL framework that is used to render 2D and 3D in a graphic content on the screen, and a WebKit that is a browser engine used to display HTMR content.

The application frameworks 2608 may include an activity manager that manages the activity lifestyle of applications, a contents provider that manages data sharing between applications, a view system that handles GUI-related tasks, a telephony manager that manages voice calls, a location manager that provides location-based services (e.g., using GPS or NFC information and supporting fine-grained location providers such as GPS and coarse-grained location providers such as cell phone triangulation), and a resource manager that manages various types of resources used by the applications 2610.

The applications 2610 include a home application 2650, a contacts application 2652, a browser application 2654, a book reader application 2656, education applications 2658-2660, gaming applications 2662-2664, and document processing module 2666. The document processing module 2666 may incorporate a document comparison module to perform the methodologies described above.

Operationally, the applications 2610 may perform API calls 2670 through the software stack of the mobile device software 2600 and receive messages 2672 in response to such API calls.

Figure 27:
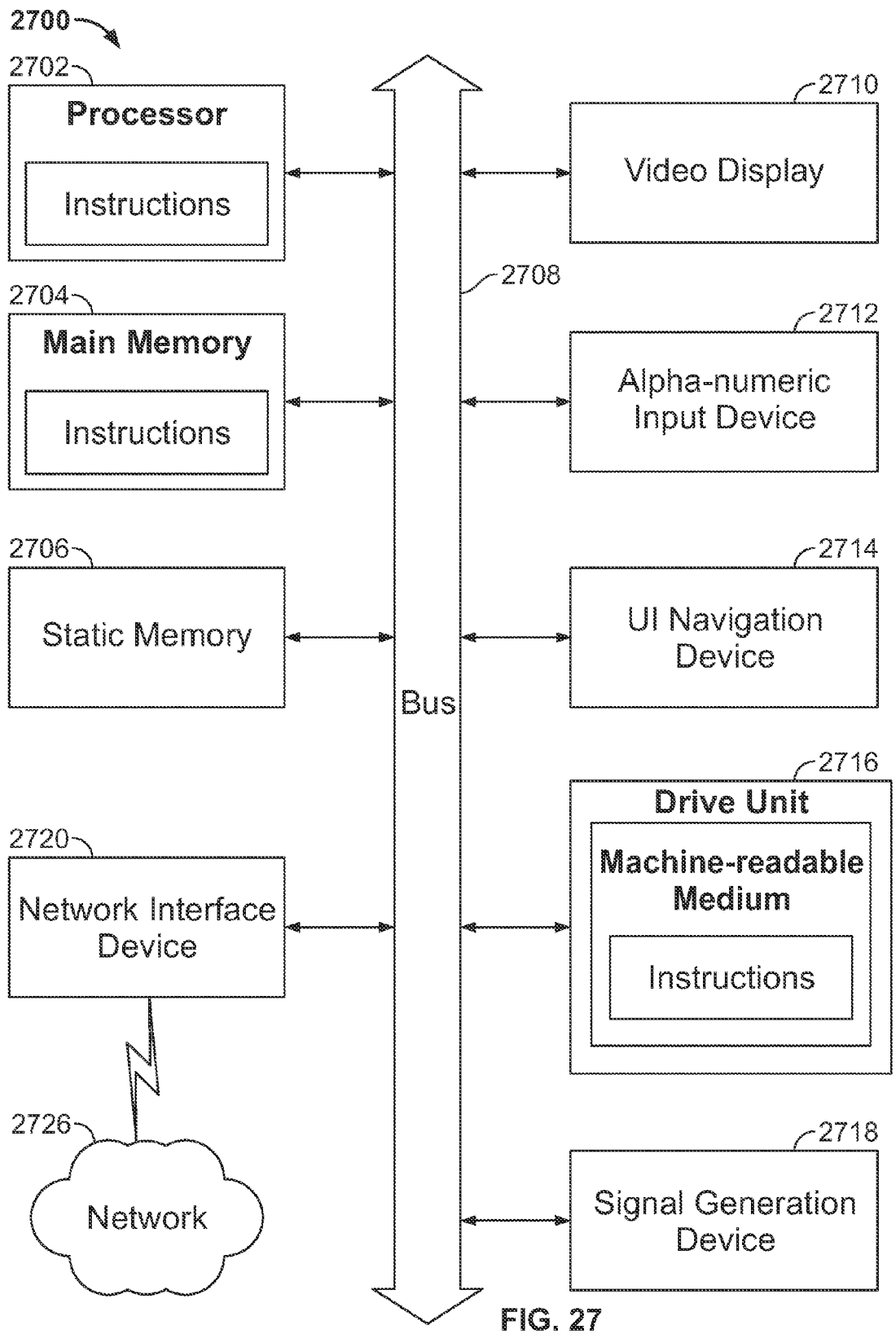
FIG. 27 is a block diagram of a machine in the example form of a computer system.

FIG. 27 is a block diagram of a machine in the example form of a computer system 2700 within which instructions, for causing the machine to perform any one or more of the methodologies discussed herein, may be executed.

In alternative examples, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2700 includes a processor 2702 (e.g., a central processing unit (CPU), a graphics processing unit (GPU) or both), a main memory 2704 and a static memory 2706, which communicate with each other via a bus 2708. The computer system 2700 may further include a video display unit 2710 (e.g., a liquid crystal display (LCD) or a cathode ray tube (CRT)). The computer system 2700 also includes an alphanumeric input device 2712 (e.g., a keyboard), a user interface (UI) navigation device 2714 (e.g., a mouse), a disk drive unit 2716, a signal generation device 2718 (e.g., a speaker) and a network interface device 2720.

The disk drive unit 2716 includes a machine-readable medium 2722 on which is stored one or more sets of instructions and data structures (e.g., software) 2724 embodying or utilized by any one or more of the methodologies or functions described herein. The instructions 2724 may also reside, completely or at least partially, within the main memory 2704 and/or within the processor 2702 during execution thereof by the computer system 2700, the main memory 2704 and the processor 2702 also constituting machine-readable media.

While the machine-readable medium 2722 is shown in an example to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 2724 may further be transmitted or received over a communications network 2726 using a transmission medium. The instructions 2724 may be transmitted using the network interface device 2720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The methodologies and systems described above may be performed by, and implemented as, logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In examples, one or more computer systems (e.g., a standalone, client, or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple such hardware-implemented modules exist contemporaneously, communications may be achieved through signal transmission (e.g., over appropriate circuits and buses) that connect the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some examples, the processor or processors may be located in a single location (e.g., within a home environment, an office environment or as a server farm), while in other examples the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

What is claimed is:

1. A computer-implemented method for sharing information related to a collaborative document hosted on a network storage service, the method comprising:
   storing a first snapshot of the collaborative document;
   receiving a first edit to the collaborative document from a first user;
   modifying the collaborative document based on the first edit;
   storing a second snapshot of the modified collaborative document;
   flattening, by a processor, the first snapshot into a first one-dimensional string to result in a first flattened snapshot;
   flattening, by the processor, the second snapshot into a second one-dimensional string to result in a second flattened snapshot;
   determining a smallest subset of the second flattened snapshot that is different from a corresponding subset of the first flattened snapshot;
   generating a feed comprising a representation of the determined smallest subset; and
   sending the feed to a client device for display on the client device.

2. The method of claim 1, wherein the representation comprises:
   a new portion generated by inverting the flattening of the determined smallest subset; and
   an old portion generated by inverting the flattening of the corresponding subset.

3. The method of claim 1, further comprising:
   receiving a second edit to the modified collaborative document from a second user;
   further modifying the modified collaborative document based on the second edit;
   storing a third snapshot of the further modified collaborative document;
   flattening the third snapshot into a third one-dimensional string to result in a third flattened snapshot;
   determining a second smallest subset of the third flattened snapshot that is different from a corresponding subset of the second flattened snapshot;
   modifying the feed to include a representation of the second smallest subset; and
   sending the feed to a client device for display on the client device.

4. The method of claim 1, further comprising:
   flattening first snapshot into a fourth one-dimensional string to result in a fourth flattened snapshot;
   flattening the second snapshot into a fifth one-dimensional string to result in a fifth flattened snapshot;
   determining a third smallest subset of the fifth flattened snapshot that is different from a corresponding subset of the fourth flattened snapshot; and
   wherein the determined smallest subset is the third smallest subset.

5. The method of claim 4, wherein:
   the collaborative document is a spreadsheet document;
   the fourth and fifth one-dimensional string each contain a plurality of identifiers; and
   each of the identifiers represents a row in the spreadsheet document.

6. The method of claim 5, wherein:
   the collaborative document is a spreadsheet document;
   the fourth and fifth one-dimensional string each contain a plurality of identifiers; and
   each of the identifiers represents a column in the spreadsheet document.

7. The method of claim 1, wherein:
   each snapshot of the collaborative document comprises a hierarchy of nodes including a plurality of levels, one master node containing data, and a plurality of non-master nodes containing data;
   each of the non-master nodes has a parent node in a level above;
   each of the nodes has zero, one, or more child nodes in a level below;
   a number of levels between each node in a level and the master node is a same number;
   wherein flattening the first snapshot into the first one-dimensional string comprises:
     selecting a level of the plurality of levels,
     mapping a first node in the selected level to a first identifier, and
     adding the first identifier to the first one-dimensional string; and
   wherein flattening the second snapshot into the second one-dimensional string comprises:
     mapping a second node in a corresponding selected level of the second snapshot to the first identifier, based on a determination that contents of the second node are the same as contents of the first node, and
     adding the first identifier to the second one-dimensional string.

8. The method of claim 7, wherein flattening the second snapshot into the second one-dimensional string further comprises:
   mapping a third node in a corresponding selected level of the second snapshot to a second identifier, based on a determination that the data contained in the third node are different from contents of any of the nodes in the selected level of the first snapshot; and
   adding the second identifier to the second one-dimensional string.

9. The method of claim 8, wherein determining the smallest subset comprises:
   determining that the first one-dimensional string does not contain the second identifier; and
   including the second identifier in the smallest subset.

10. The method of claim 7, wherein determining the smallest subset comprises:
    determining that the first one-dimensional string and the second one-dimensional string contain the first identifier; and
    excluding the first identifier from the smallest subset.

11. A system for sharing information related to a collaborative document hosted on a network storage service, comprising:
    one or more processors; and
    memory storing one or more programs for execution by the one or more processors, the one or more programs comprising instructions for:
      storing a first snapshot of the collaborative document;
      receiving a first edit to the collaborative document from a first user;

modifying the collaborative document based on the first edit;

storing a second snapshot of the modified collaborative document;

flattening, by the one or more processors, the first snapshot into a first one-dimensional string to result in a first flattened snapshot;

flattening, by the one or more processors, the second snapshot into a second one-dimensional string to result in a second flattened snapshot;

determining a smallest subset of the second flattened snapshot that is different from a corresponding subset of the first flattened snapshot;

generating a feed comprising a representation of the determined smallest subset; and sending the feed to a client device for display on the client device.

12. The system of claim 11, wherein the representation comprises:

a new portion generated by inverting the flattening of the determined smallest subset; and an old portion generated by inverting the flattening of the corresponding subset.

13. The system of claim 11, further comprising:

receiving a second edit to the modified collaborative document from a second user;

further modifying the modified collaborative document based on the second edit;

storing a third snapshot of the further modified collaborative document;

flattening the third snapshot into a third one-dimensional string to result in a third flattened snapshot;

determining a second smallest subset of the third flattened snapshot that is different from a corresponding subset of the second flattened snapshot; and modifying the feed to include a representation of the second smallest subset; and sending the feed to a client device for display on the client device.

14. The system of claim 11, the one or more programs further comprising instructions for:

flattening first snapshot into a fourth one-dimensional string to result in a fourth flattened snapshot;

flattening the second snapshot into a fifth one-dimensional string to result in a fifth flattened snapshot;

determining a third smallest subset of the fifth flattened snapshot that is different from a corresponding subset of the fourth flattened snapshot; and wherein the determined smallest subset is the third smallest subset.

15. The system of claim 14, wherein:

the collaborative document is a spreadsheet document;

the fourth and fifth one-dimensional string each contain a plurality of identifiers; and each of the identifiers represents a row in the spreadsheet document.

16. The system of claim 15, wherein:

the collaborative document is a spreadsheet document;

the fourth and fifth one-dimensional string each contain a plurality of identifiers; and each of the identifiers represents a column in the spreadsheet document.

17. The system of claim 11, wherein:

each snapshot of the collaborative document comprises a hierarchy of nodes including a plurality of levels, one master node containing data, and a plurality of non-master nodes containing data;

each of the non-master nodes has a parent node in a level above;

each of the nodes has zero, one, or more child nodes in a level below;

a number of levels between each node in a level and the master node is a same number; wherein flattening the first snapshot into the first one-dimensional string comprises:

selecting a level of the plurality of levels, mapping a first node in the selected level to a first identifier, and adding the first identifier to the first one-dimensional string; and wherein flattening the second snapshot into the second one-dimensional string comprises:

mapping a second node in a corresponding selected level of the second snapshot to the first identifier, based on a determination that contents of the second node are the same as contents of the first node; and adding the first identifier to the second one-dimensional string.

18. The system of claim 17, wherein flattening the second snapshot into the second one-dimensional string further comprises:

mapping a third node in a corresponding selected level of the second snapshot to a second identifier, based on a determination that the data contained in the third node are different fromcontents of any of the nodes in the selected level of the first snapshot; and adding the second identifier to the second one-dimensional string.

19. The system of claim 18, wherein determining the smallest subset comprises:

determining that the first one-dimensional string does not contain the second identifier; and including the second identifier in the smallest subset.

20. The system of claim 17, wherein determining the smallest subset comprises:

determining that the first one-dimensional string and the second one-dimensional string contain the first identifier; and excluding the first identifier from the smallest subset.

* * * * *